(12) United States Patent
Machida

(10) Patent No.: US 10,198,198 B2
(45) Date of Patent: Feb. 5, 2019

(54) STORAGE DEVICE THAT STORES SETTING VALUES FOR OPERATION THEREOF

(71) Applicant: Toshiba Memory Corporation, Tokyo (JP)

(72) Inventor: Satoshi Machida, Fujisawa Kanagawa (JP)

(73) Assignee: Toshiba Memory Corporation, Tokyo (JP)

( * ) Notice: Subject to any disclaimer, the term of this patent is extended or adjusted under 35 U.S.C. 154(b) by 179 days.

(21) Appl. No.: 15/231,504

(22) Filed: Aug. 8, 2016

(65) Prior Publication Data

US 2017/0199686 A1     Jul. 13, 2017

Related U.S. Application Data

(60) Provisional application No. 62/277,208, filed on Jan. 11, 2016.

(51) Int. Cl.
    *G06F 1/26*     (2006.01)
    *G06F 1/28*     (2006.01)
    *G06F 3/06*     (2006.01)

(52) U.S. Cl.
    CPC ............ *G06F 3/0619* (2013.01); *G06F 1/266* (2013.01); *G06F 1/28* (2013.01); *G06F 3/065* (2013.01); *G06F 3/0629* (2013.01); *G06F 3/0685* (2013.01)

(58) Field of Classification Search
    CPC ...... G06F 1/266; G06F 3/0619; G06F 3/0629; G06F 3/065; G06F 3/0685
    See application file for complete search history.

(56) References Cited

U.S. PATENT DOCUMENTS

| | | | |
|---|---|---|---|
| 9,170,887 B2 | 10/2015 | Nakamura et al. | |
| 2002/0174283 A1* | 11/2002 | Lin | G06F 11/1441 711/1 |
| 2012/0159210 A1* | 6/2012 | Hosaka | G06F 1/3212 713/320 |
| 2015/0052397 A1* | 2/2015 | Nakamura | G06F 11/1415 714/22 |
| 2015/0262696 A1 | 9/2015 | Sakata et al. | |
| 2016/0328163 A1* | 11/2016 | Yoon | G06F 11/1446 |

* cited by examiner

*Primary Examiner* — Terrell S Johnson
(74) *Attorney, Agent, or Firm* — Patterson & Sheridan, LLP

(57) ABSTRACT

A storage device includes a volatile memory, a nonvolatile memory, an auxiliary power source, and a controller configured to start a setting process to store a setting value in the volatile memory in response to a setting command received from a host, and operate in accordance with one or more setting values stored in the volatile memory. When the controller determines that a main power supply will stop, power from the auxiliary power source starts to be primarily used, and the controller saves at least part of said one or more setting values stored in the volatile memory to the nonvolatile memory, before power supply from the auxiliary power source ends.

18 Claims, 18 Drawing Sheets

STORAGE DEVICE THAT STORES SETTING VALUES FOR OPERATION THEREOF

CROSS-REFERENCE TO RELATED APPLICATIONS

This application is based upon and claims the benefit of priority from U.S. Provisional Patent Application No. 62/277,208, filed on Jan. 11, 2016, the entire contents of which are incorporated herein by reference.

FIELD

Embodiments described herein relate generally to a storage device, in particular, a storage device that stores setting value for operation thereof.

BACKGROUND

A storage device that stores data in response to a request from a host device is known.

DETAILED DESCRIPTION

A storage device includes a volatile memory, a nonvolatile memory, an auxiliary power source, and a controller configured to start a setting process to store a setting value in the volatile memory in response to a setting command received from a host, and operate in accordance with one or more setting values stored in the volatile memory. When the controller determines that a main power supply will stop, power from the auxiliary power source starts to be primarily used, and the controller saves at least part of said one or more setting values stored in the volatile memory to the nonvolatile memory, before power supply from the auxiliary power source ends.

A storage device and a storage system according to embodiments will be described below, with reference to the drawings.

(First Embodiment)

Figure 1:
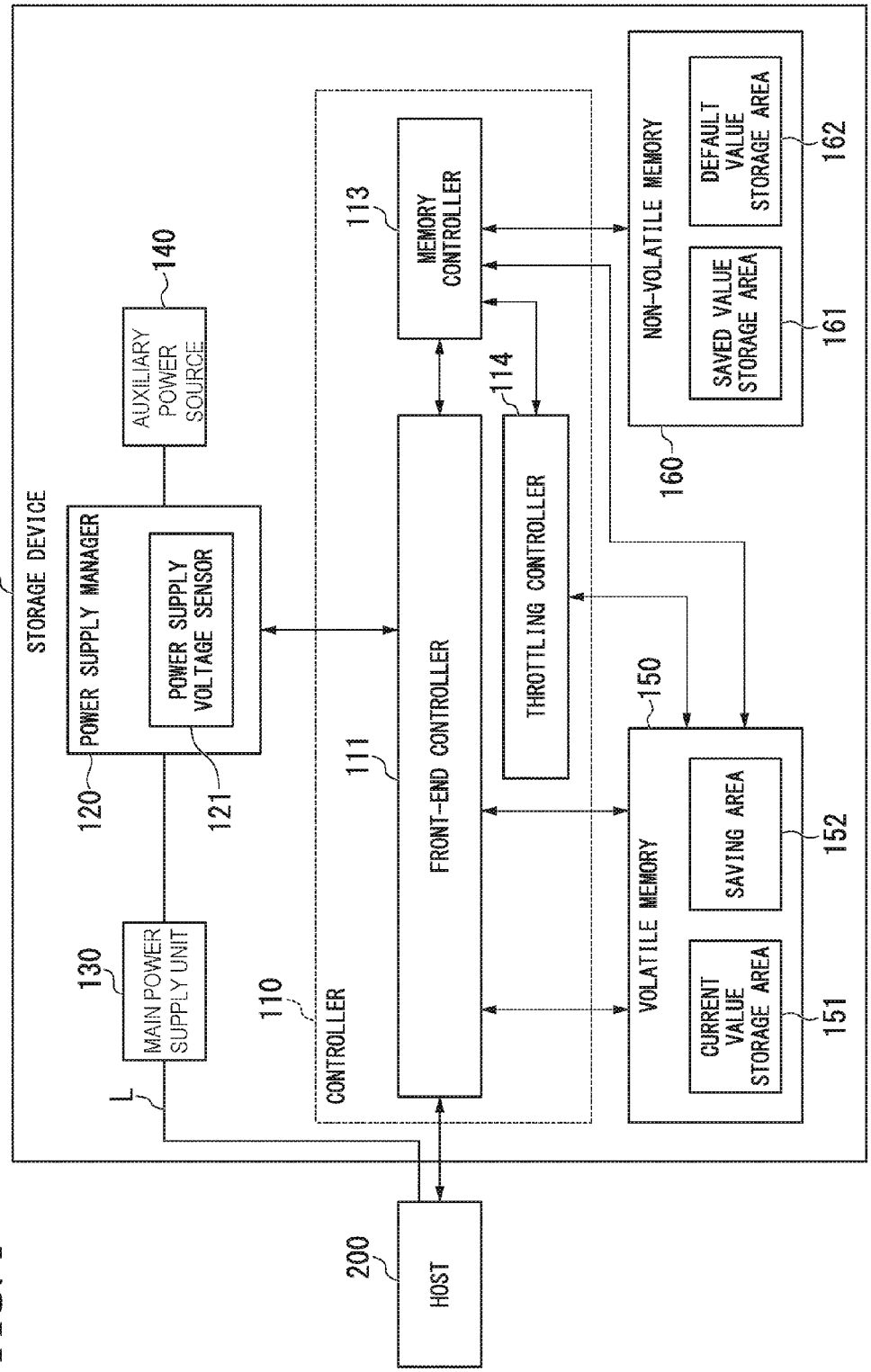
FIG. 1 shows an example of a storage system including a storage device according to a first embodiment.

FIG. 1 shows an example of a storage system including a storage device according to a first embodiment. First, referring to FIG. 1, the storage device 100 will be generally described. The storage device 100 is, for example, an SSD (solid-state drive), but is not limited thereto. The storage device 100 has a controller 110, a power supply manager 120, a main power supply unit 130, an auxiliary power source 140, a volatile memory 150, and a non-volatile memory 160.

The controller 110 is implemented by a CPU (central processing unit) executing a program stored in a program memory. The controller 110 may be implemented by hardware, such as an LSI (large-scale integration) device, an ASIC (application-specific integrated circuit) or an FPGA (field-programmable gate array), having the same functionality as the processor executing the program.

The power supply manager 120 is connected to the main power supply unit 130 and the auxiliary power source 140. The main power supply unit 130 is a power supply circuit that supplies, to the various parts of the storage device 100, power that is supplied from a host device (hereinafter referred to as the "host") 200 via a power supply line L. If the power supplied from the host 200 to the main power supply unit 130 is interrupted or if the controller 110 outputs a power-off notification to the power supply manager 120, power supply from the main power supply unit 130 stops. The auxiliary power source 140 has a storage battery that stores electrical power supplied from the main power supply unit 130. If power supply from the main power supply unit 130 stops improperly, the auxiliary power source 140 supplies power to the storage device 100 in place of the main power supply unit 130. Improper shutoff of power from the main power supply unit 130 occurs, for example, when a power outage causes the power supply from the main power supply unit 130 to stop.

The power supply manager 120 has a power supply voltage sensor 121 that senses a voltage value of the main power supply unit 130 and transmits the sensed voltage value to the controller 110. If the voltage value transmitted from the power supply voltage sensor 121 is below a pre-established threshold value TH, the power supply manager 120 supplies power from the auxiliary power source 140 to the controller 110.

The volatile memory 150 temporarily stores setting values of the storage device 100. The setting value is, for example, a setting value of a throttling amount in a throttling control. The throttling control is a control to limit frequency of predetermined processing performed with respect to non-volatile memory 160 (for example, processing to read data from the non-volatile memory 160, processing to write data into the non-volatile memory 160, and garbage collection), depending upon the object of the processing. The garbage collection is processing to copy valid data stored in one memory block to another memory block and delete data stored in the original memory block, for another use of the memory block. The setting value is not limited to the throttling amount, and may be, for example, an error recovery setting value, a power management setting value, or a write protect setting value.

The volatile memory 150 may be various types of RAM, such as DRAM (dynamic random-access memory). The volatile memory 150 has a current value storage area (first area) 151, in which current setting values for the storage device 100 are stored, and a saving area (second area) 152, in which setting values that will be written into the non-volatile memory 160 are stored.

The non-volatile memory 160 is, for example, a NAND-type flash memory, a bit cost scalable (BiCS) memory, a magnetoresistive memory (MRAM), a phase-change memory (PcRAM), a resistive random-access memory (RRAM®), or a combination thereof. The non-volatile memory 160 has a saved value storage area (third area) 161, in which setting values read out from the saving area 152 of the volatile memory 150 are stored, and a default value storage area (fourth area) 162, in which default values of the setting values are stored. The default value is a setting value initially set for the storage device 100.

The host 200 is capable of communicating with the storage device 100 by an NVMe (non-volatile memory express) standard, but is not limited thereto. For example, the host 200 may be connected to and communicate with the storage device 100 in accordance with SAS (Serial Attached SCSI) or SATA (Serial Advanced Technology Attachment) standards.

The host 200 transmits commands such as read commands, write commands, delete commands, and setting commands to the storage device 100. The read command is for reading out information from the storage device 100. The write command is for writing information to the storage device 100. The delete command is for deleting information stored in the storage device 100. The setting command is for setting operations of the storage device 100.

The controller 110 controls the storage device 100 based on setting values stored in the volatile memory 150. The controller 110 has a front-end controller 111, a memory controller 113, and a throttling controller 114. The front-end controller 111, the memory controller 113, and the throttling controller 114 are implemented, for example, by the controller 110 executing a program stored in a program memory.

The front-end controller 111 receives a command from the host 200 and controls writing of data into the current value storage area 151 of the volatile memory 150 and the saving area 152 of the volatile memory 150. The memory controller 113 controls the writing of data with respect to the saved value storage area 161 of the non-volatile memory 160. The throttling controller 114, based on a setting value (for example, the throttling amount) stored in the current value storage area 151 of the volatile memory 150, controls the frequency of predetermined processing performed by the memory controller 113 with respect to the non-volatile memory 160. The predetermined processing performed by the memory controller 113 with respect to the non-volatile memory 160 is, for example, processing to read data out from the non-volatile memory 160, processing to write data into the non-volatile memory 160, and garbage collection. During the throttling control, for example, by inserting an appropriate amount of wait time (dummy wait) into a time slot during which the predetermined processing is performed with respect to the non-volatile memory 160, the throttling controller 114 adjusts the frequency of the predetermined processing performed with respect to the non-volatile memory 160. The frequency means the number of times processing with respect to the non-volatile memory 160 is executed per unit time.

Figure 2:
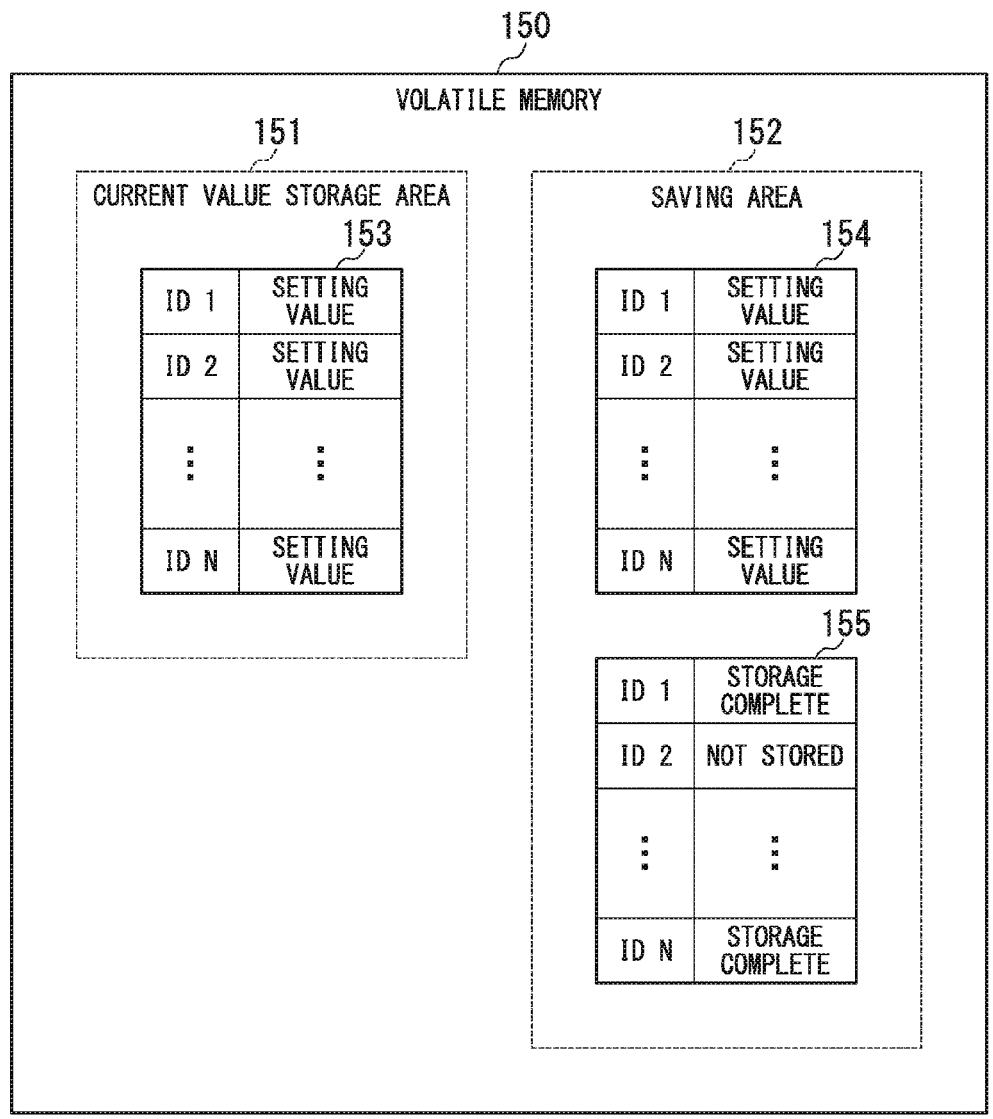
FIG. 2 shows an example of a data storage area of a volatile memory of the storage device according to the first embodiment.

FIG. 2 shows an example of data storage areas of the volatile memory 150. As shown in FIG. 2, setting values 153 are stored in the current value storage area 151. The setting values 153 are setting values currently set in the storage device 100, and are stored in the current value storage area 151, in association with a plurality of IDs. The IDs are assigned to each of different control operations. For example, ID1 is assigned to a setting value for throttling control, ID2 is assigned to a setting value for error recovery, ID3 is assigned to a setting value of power management, and ID4 is assigned to a setting value of write-protect. The setting values in the present embodiment are not limited to these setting values.

The saving area 152 stores therein the setting values 154 and management information 155 that are saved into the non-volatile memory 160 when power to the storage device 100 is shut off. The setting values 154, similar to the setting values 153, are stored in the saving area 152 in association with a plurality of IDs. The management information 155 indicates, for each ID of the setting values 154, whether or not the corresponding setting value 154 has been saved in the saving area 152.

Figure 3:
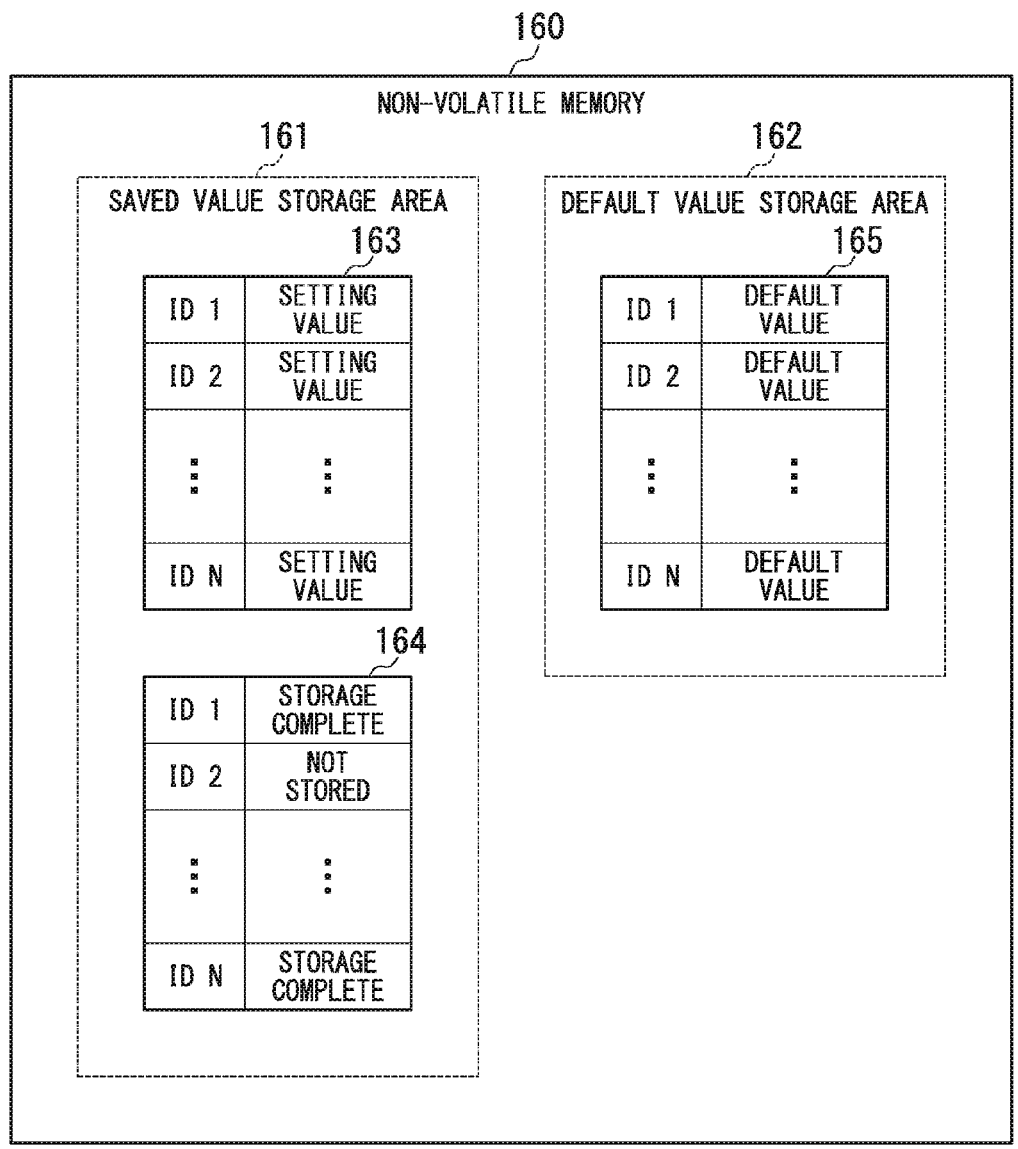
FIG. 3 shows an example of a data storage area of a non-volatile memory of the storage device according to the first embodiment.

FIG. 3 shows an example of data storage areas of the non-volatile memory 160. As shown in FIG. 3, the saved value storage area 161 stores therein the setting values 163 and the management information 164. The setting values 163 and the management information 164 are information that, when the power supply to the storage device 100 is shut off, are saved from the saving area 152 of the volatile memory 150 in the saved value storage area 161 of the non-volatile memory 160.

The default value storage area 162 stores therein the default values 165 of the setting values. The default values 165 are stored in the default value storage area 162 in association with a plurality of IDs. The IDs of the default values 165 are the same as those of the setting values 153, 154, and 163.

Figure 4:
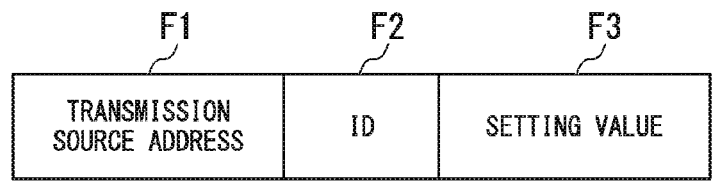
FIG. 4 shows a structure of a setting command transmitted from a host of the storage system.

FIG. 4 shows a structure of a setting command transmitted from the host. The host 200 carries out the setting of the storage device 100 by sending the setting command shown in FIG. 4 to the storage device 100. In the following, Set Features command in accordance with the NVMe standard will be described as an example of the setting command.

The Set Features command has a first field F1, a second field F2, and a third field F3. The first field F1 indicates a transmission source address of the Set Features command. The second field F2 indicates the ID of the setting value. The third field F3 indicates the setting value.

Figure 5:
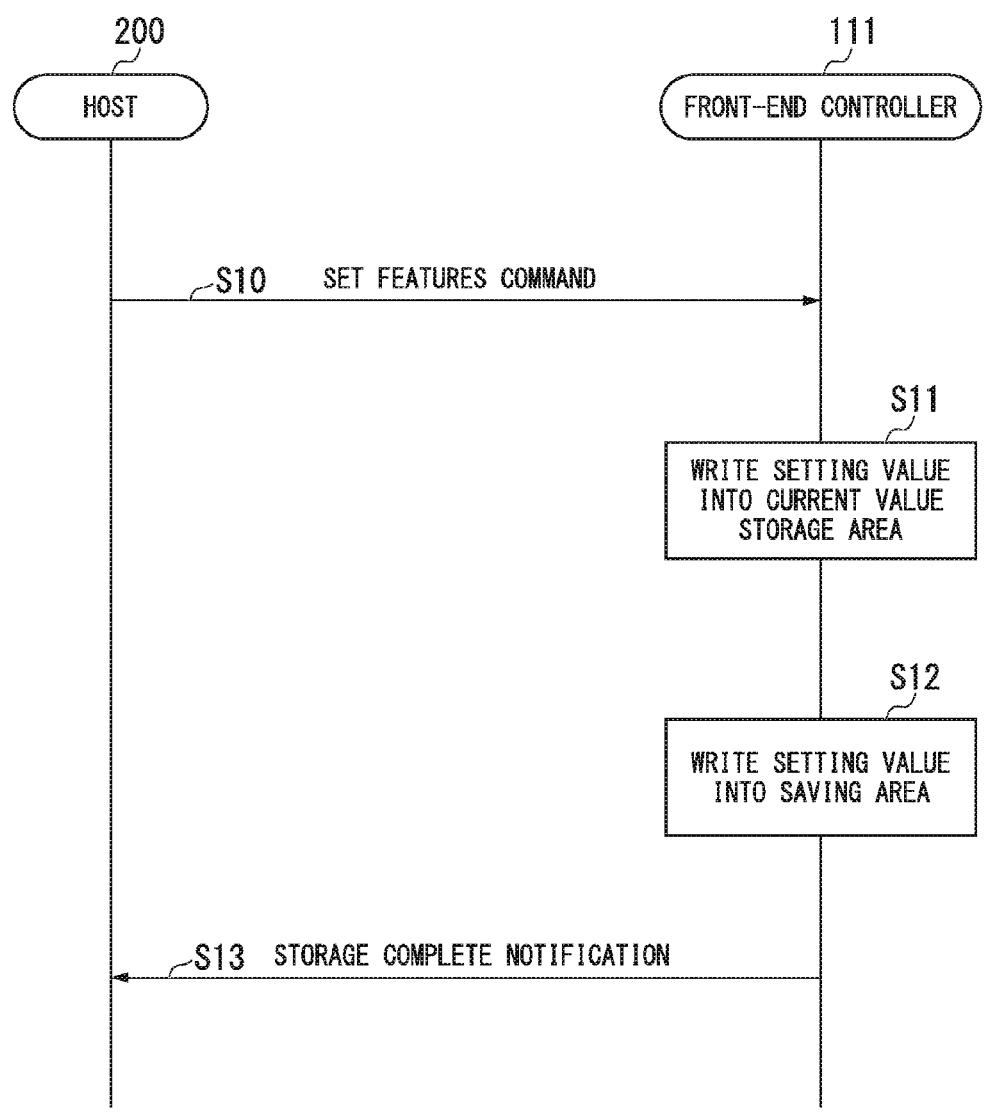
FIG. 5 is a sequence diagram showing setting processing carried out by the storage system.

FIG. 5 is a sequence diagram showing setting processing performed in the storage system. The host 200 transmits the Set Features command shown in FIG. 4 to the front-end controller 111 of the storage device 100 (S10). Upon receiving the Set Features command from the host 200, the front-end controller 111 writes a setting value included in the received Set Features command into the current value storage area 151 of the volatile memory 150. Specifically, the front-end controller 111 acquires the ID from the second field F2 of the received Set Features command and the setting value from the third field F3 thereof. The front-end controller 111 overwrites the setting value 153 in the current value storage area 151 corresponding to the ID acquired from the third field F3 with the setting value acquired from the second field F2. As a result, the setting value 153 based on the Set Features command is written into the current value storage area 151 (S11).

The front-end controller 111 writes the setting value included in the received Set Features command into the saving area 152 of the volatile memory 150. Specifically, the front-end controller 111 overwrites the setting value 154 in the saving area 152 corresponding to the ID acquired from the second field F2 with the setting value acquired from the third field F3. As a result, the setting value 154 based on the Set Features command is written into the saving area 152 (S12).

When the storage of the setting value 154 in the saving area 152 is completed, the front-end controller 111 transmits a storage-complete notification to the host 200 (S13). Upon the host 200 receiving the storage-complete notification from the front-end controller 111, the setting processing in the storage device shown in FIG. 5 ends.

Figure 6:
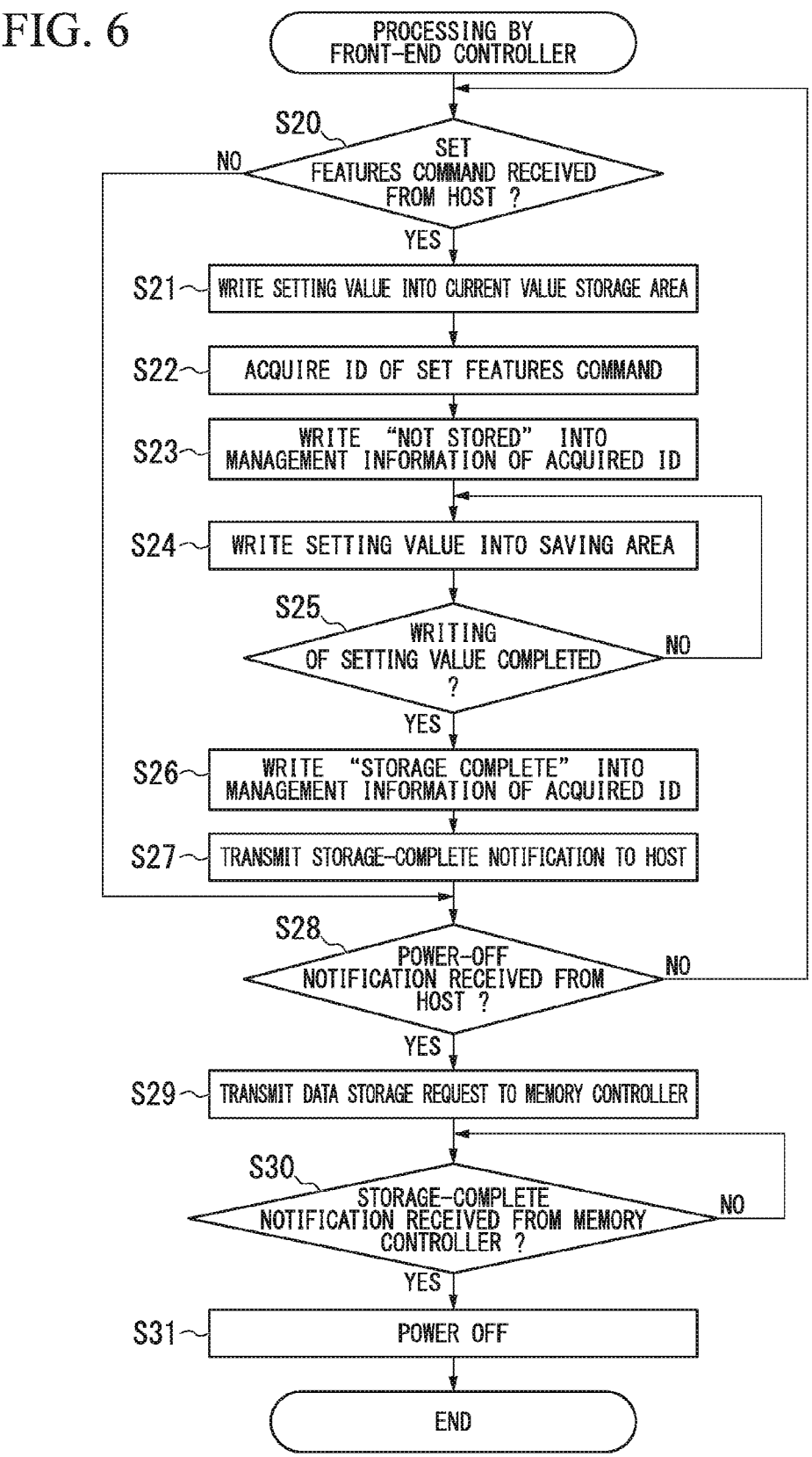
FIG. 6 is a flowchart showing processing carried out by a front-end controller of the storage device according to the first embodiment.

FIG. 6 is a flowchart showing processing by the front-end controller according to the first embodiment. First, the front-end controller 111 determines whether or not a Set Features command has been received from the host 200 (S20). If the front-end controller 111 determines that no Set Features command has been received (No in S20), the processing proceeds to step S28. If the front-end controller 111 determines that the Set Features command has been received (Yes in S20), the setting value included in the received Set Features command is stored in the current value storage area 151 (S21).

Then, the front-end controller 111 acquires the ID from the second field F2 of the received Set Features command (S22). Next, the front-end controller 111 writes "Not stored" in the management information 155 corresponding to the acquired ID stored in the saving area 152 of the volatile memory 150 (S23). For example, if the ID acquired from the second field F2 of the Set Features command is 2, as shown in FIG. 2, "Not stored" is written into the management information 155 corresponding to ID2 in the saving area 152. After that, the front-end controller 111 writes the setting value acquired from the third field F3 of the Set Features command in the saving area 152 as the setting value 154 corresponding to ID2 (S24).

Next, the front-end controller 111 determines whether or not the writing of the setting value into the saving area 152 has been completed (S25). If the front-end controller 111 determines that the writing of the setting value into the saving area 152 has not been completed (No in S25), the processing returns to step S24. If, however, the front-end controller 111 determines that the writing of the setting value into the saving area 152 has been completed (Yes in S25), "Storage complete" is written into the management information 155 of the acquired ID (S26). After that, the front-end controller 111 transmits a storage-complete notification to the host 200 (S27).

Next, the front-end controller 111 determines whether or not a power-off notification has been received from the host 200 (S28). The power-off notification is a notification that main power supply unit 130 of the storage device 100 is scheduled to be shut off. If the front-end controller 111 determines that no power-off notification has been received from the host 200 (No in S28), the processing returns to step S20. If, however, the front-end controller 111 determines that the power-off notification has been received from the host 200 (Yes in S28), the front-end controller 111 transmits a data storage request to the memory controller 113 (S29).

Next, the front-end controller 111 determines whether or not the storage-complete notification has been received from the memory controller 113 (S30). If the front-end controller 111 determines that no storage-complete notification has been received from the memory controller 113 (No in S30), the processing returns to step S30. If, however, the front-end controller 111 determines that the storage-complete notification has been received from the memory controller 113 (Yes in S30), the power-off notification is transmitted to the power supply manager 120. Upon receiving the power-off notification from the front-end controller 111, the power supply manager 120 shuts off the power supply from the main power supply unit 130 (S31) and ends the processing.

Figure 7:
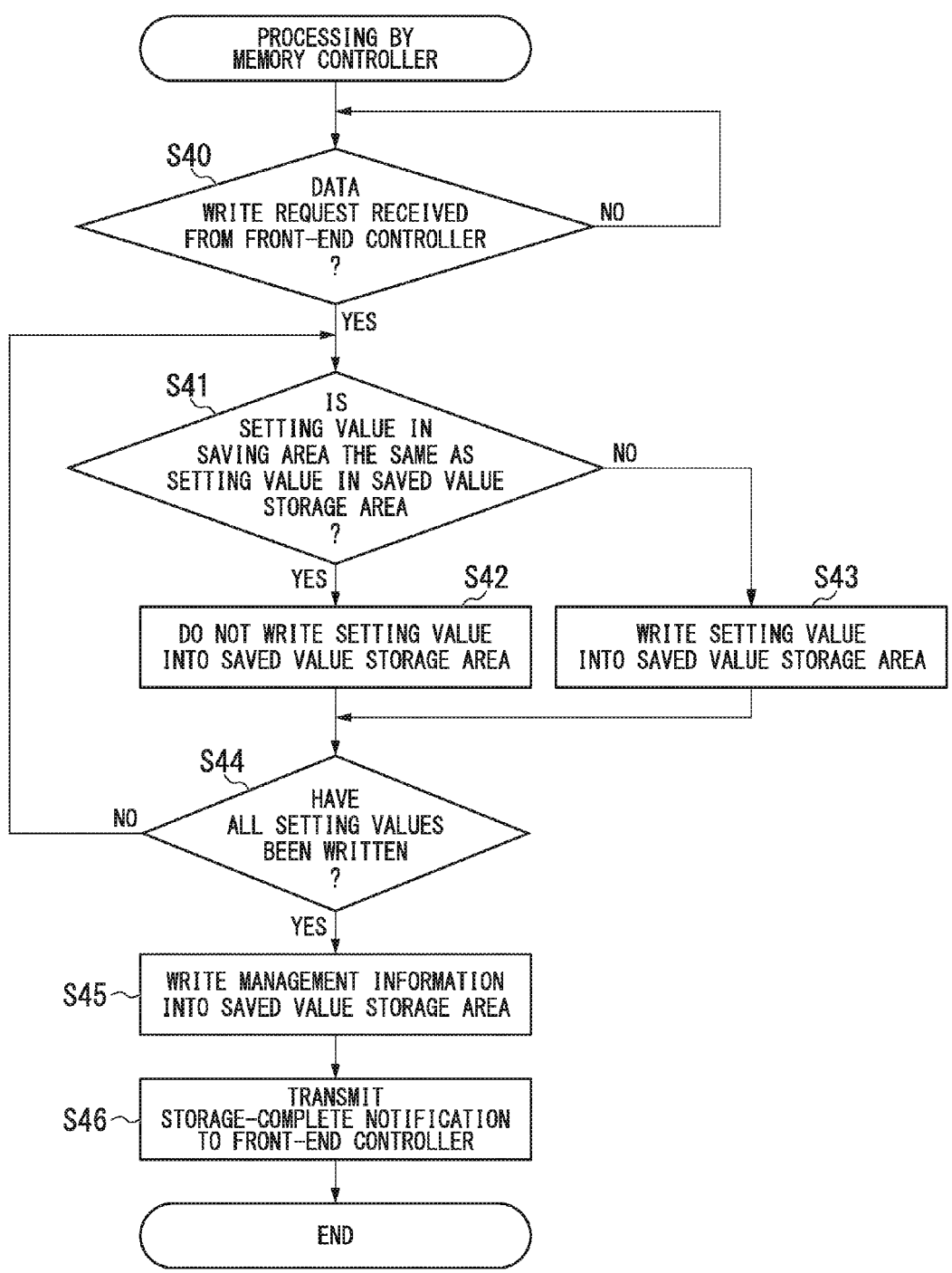
FIG. 7 is a flowchart showing processing carried out by a memory controller of the storage device according to the first embodiment.

FIG. 7 is a flowchart showing processing by the memory controller 113 according to the first embodiment. First, the memory controller 113 determines whether or not a data storage request transmitted from the front-end controller 111 at step S29 in FIG. 6 has been received (S40). If the memory controller 113 determines that no data storage request has been received from the front-end controller 111 (No in S40), the processing returns to step S40.

If, however, the memory controller 113 determines that the data storage request has been received from the front-end controller 111 (Yes in S40), the memory controller 113 reads out the setting value 154 and the management information 155 from the saving area 152 of the volatile memory 150. Then, the memory controller 113 determines whether or not the setting value 154 read out from the saving area 152 and the setting value 163 stored in the saved value storage area 161 are the same (S41). If the memory controller 113 determines that the setting value 154 read out from the saving area 152 and the setting value 163 stored in the saved value storage area 161 are the same (Yes in S41), the setting value 154 read out from the saving area 152 is not written into the saved value storage area 161 (S42).

In this manner, even if power supply from the main power supply unit 130 of the storage device 100 stops, if the setting value 154 stored in the saving area 152 and the setting value 163 stored in the saved value storage area 161 are the same, the memory controller 113 does not write the setting value 154 stored in the saving area 152 into the saved value storage area 161. This procedure can reduce frequency of a process of the memory controller 113 writing data into the non-volatile memory 160, and can extend the life of the non-volatile memory 160.

If, however, the memory controller 113 determines that the setting value 154 read out from the saving area 152 and the setting value 163 stored in the saved value storage area 161 are different (No in step S41), the memory controller 113 writes the setting value 154 read out from the saving area 152 into the saved value storage area 161 (S43).

After step S42 and step S43, the memory controller 113 determines whether or not all setting values in the saving area 152 have been written into the saved value storage area 161 (S44). If the memory controller 113 determines that all setting values in the saving area 152 have not been written into the saved value storage area 161 (No in S44), the processing returns to step S41 in order to write the setting value for the next ID.

If, however, the memory controller 113 determines that all setting values in the saving area 152 have been written into the saved value storage area 161 (Yes in S44), the management information 155 read out from the saving area 152 is written into the saved value storage area 161 as the management information 164 (S45). After that, the memory controller 113 transmits a storage-complete notification to the front-end controller 111 (S46) and ends the processing.

In this manner, if the controller 110 receives from the host 200 the power-off notification that the power supply of the storage device 100 is scheduled to be stopped, the power supply from the main power supply unit 130 stops after the setting values stored in the volatile memory 150 are written into the non-volatile memory 160. Specifically, if the front-end controller 111 receives the Set Features command from the host 200, the setting value included in the Set Features command is written into the current value storage area 151 and the saving area 152. If the power supply from the main power supply unit 130 of the storage device 100 is to be stopped, the memory controller 113 reads out setting values 154 from the saving area 152. The memory controller 113 writes the setting values 154 read out from the saving area 152 into the saved value storage area 161 as the setting values 163. This procedure can reduce the frequency of data writing to the non-volatile memory 160, and thus leads to an extension of the life of the non-volatile memory 160.

Figure 8:
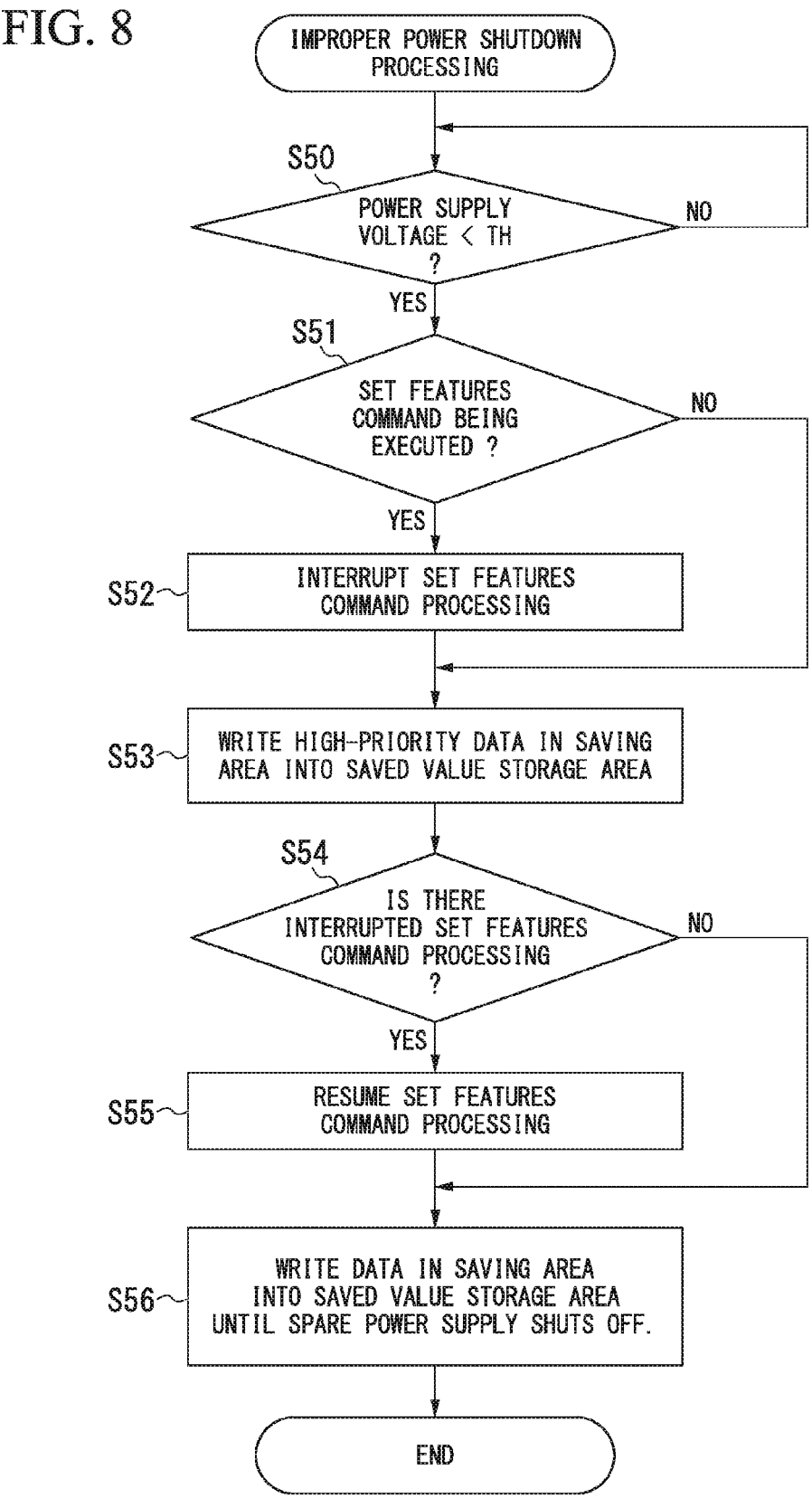
FIG. 8 is a flowchart showing processing carried out upon an improper power shutoff according to the first embodiment.

FIG. 8 is a flowchart showing processing of the storage device 100 according to the first embodiment at the time of an improper power shutoff. The front-end controller 111 executes the processing shown in FIG. 6 and the processing shown in FIG. 8 in parallel. In this case, the improper power shutoff means cut-off of the power to the storage device 100 without following the proper procedure. For example, the improper power shutoff occurs when a power outage causes the power supply from the main power supply unit 130 to be stopped.

First, the power supply voltage sensor 121 senses the voltage value of the main power supply unit 130. The power supply manager 120 transmits the voltage value sensed by the power supply voltage sensor 121 to the front-end controller 111. The front-end controller 111 determines whether or not the voltage value received from the power supply manager 120 is below the pre-established threshold TH (S50). If the front-end controller 111 determines that the voltage value received from the power supply manager 120 is not below the pre-established threshold TH (No in S50), the processing returns to step S50.

If, however, the front-end controller 111 determines that the voltage value sensed by the power supply voltage sensor 121 is below the pre-established threshold TH (Yes in S50), the front-end controller 111 outputs a power supply switching request to the power supply manager 120. The power supply manager 120, based on the power supply switching request from the front-end controller 111, switches a (primary) source of power to be supplied the storage device 100 from the main power supply unit 130 to the auxiliary power source 140. This procedure enables continued operation of the storage device 100 as long as power is supplied from the auxiliary power source 140 to the storage device 100, even when an improper power shutoff occurs because of, for example, a power outage.

If the front-end controller 111 determines that the voltage value received from the power supply manager 120 is below the pre-established threshold TH (Yes in S50), the front-end controller 111 determines whether or not processing based on the Set Features command is being executed (S51). The processing based on the Set Features command includes processing to write the setting value included in the Set Features command into the saving area 152. If the front-end controller 111 determines that processing based on the Set Features command is not being executed (No in S51), the processing proceeds to step S53.

If, however, the front-end controller 111 determines that the processing based on the Set Features command is being executed (Yes in S51), the processing based on the Set Features command is interrupted (S52). When the processing based on the Set Features command is interrupted, the setting value included in the Set Features command is not written into the saving area 152. For this reason, "Not stored" remains written in the management information 155 corresponding to the ID included in the Set Features command.

After that, the front-end controller 111 writes high-priority data (first data) stored in the saving area 152 into the saved value storage area 161 (S53). The high-priority data includes user data for which a user operating the host 200 instructs to store into the non-volatile memory 160, but is not limited thereto. For example, the high-priority data may be management data for managing a user using the storage device 100. The setting values for some IDs may be treated as the high-priority data.

Next, the front-end controller 111 determines whether or not there is processing based on a Set Features command that has been interrupted at step S52 (S54). If the front-end controller 111 determines that there is no interrupted processing based on the Set Features command (No in S54), the processing proceeds to step S56. If, however, the front-end controller 111 determines that there is interrupted processing based on the Set Features command (Yes in S54), the interrupted processing based on the Set Features command is resumed (S55). When the interrupted processing based on the Set Features command is resumed, the setting value included in the Set Features command is written into the saving area 152. After that, the memory controller 113 writes as much data in the saving area 152 as possible into the saved value storage area 161 until power is no longer supplied from the auxiliary power source 140 (S56).

In this manner, if the voltage value transmitted from the power supply voltage sensor 121 falls below the threshold TH (i.e., when the power supply from the main power supply unit 130 is stopped), the controller 110 writes the setting values and management information stored in the volatile memory 150 into the saved value storage area 161 of the non-volatile memory 160 before the supply of power from the auxiliary power source 140 stops. If the power supply from the main power supply unit 130 of the storage device 100 is stopped, the controller 100 writes high-priority data (first data) stored in the volatile memory 150 into the non-volatile memory 160 before writing the setting values 154. This procedure enables reliable storage of the high-priority data into the non-volatile memory 160, thereby preventing the loss of the high-priority data after the power supply to the storage device 100 stops.

If the power supply from the main power supply unit 130 of the storage device 100 is stopped, the controller 110 interrupts the processing based on the Set Features command and writes the high-priority data stored in the volatile memory 150 into the non-volatile memory 160. This procedure prevents the loss of the high-priority data after the power supply of the storage device 100 stops, more reliably.

After the storage of high-priority data is completed, the controller 110 resumes the processing based on the Set Features command, which had been interrupted and, after completion of the processing based on the Set Features command, the controller 110 writes the setting values 154 into the non-volatile memory 160. This procedure can save setting values 154 that were stored in the saving area 152 during the resumed processing based on the Set Features command in non-volatile memory 160.

Figure 9:
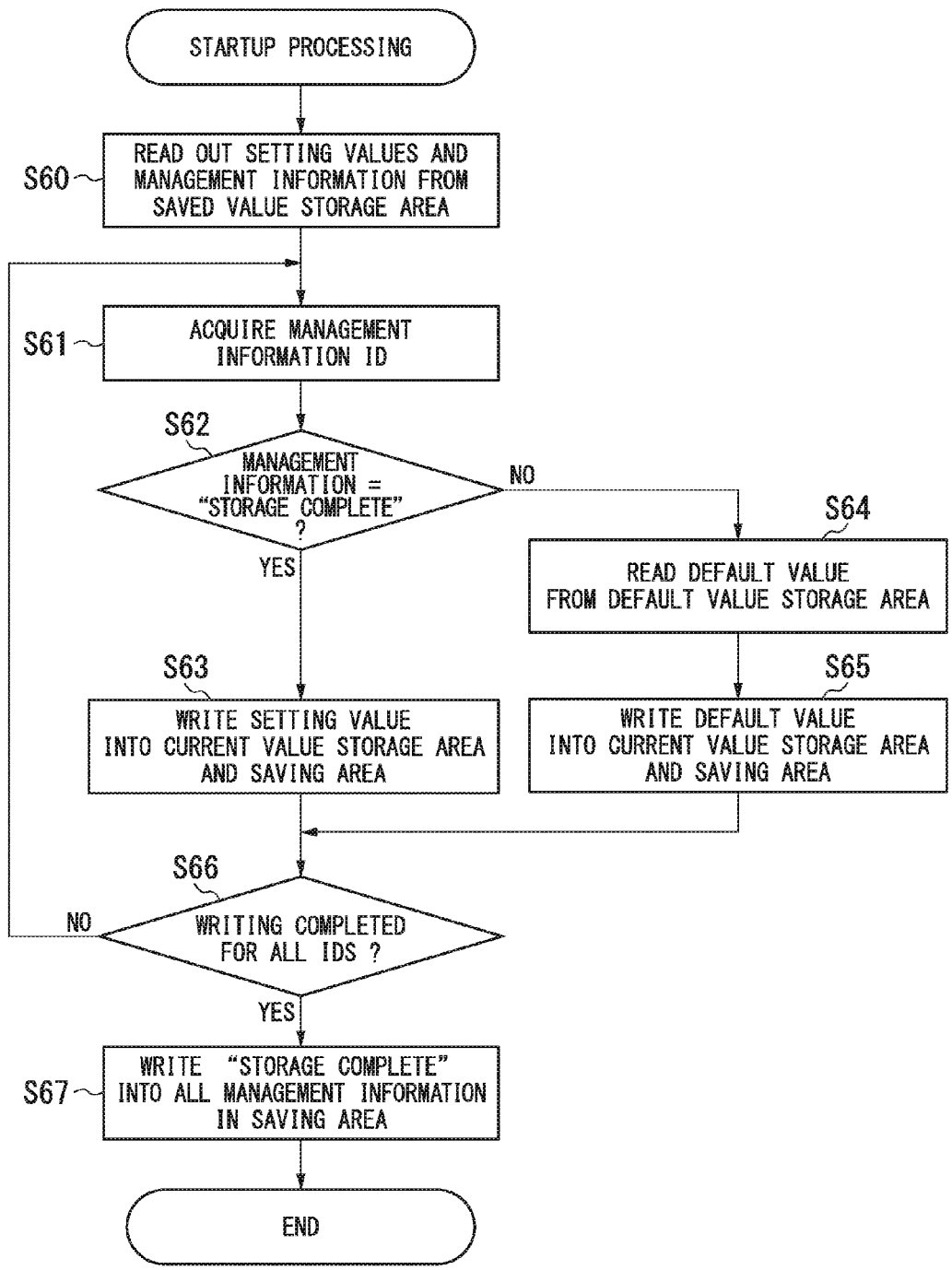
FIG. 9 is a flowchart showing processing carried out when the storage device according to the first embodiment is started.

FIG. 9 is a flowchart showing the processing of the storage device 100 according to the first embodiment when the storage device 100 starts operating. When the main power supply unit 130 starts supplying power, the storage device 100 starts operating. When the storage device 100 starts operating, the memory controller 113 reads out the setting values 163 and the management information 164 from the saved value storage area 161 (S60). The memory controller 113 transmits the setting values 163 and the management information 164 read out from the saved value storage area 161 to the front-end controller 111.

Upon receiving the setting values 163 and the management information 164 from the memory controller 113, the front-end controller 111 acquires one ID from the management information 164 (S61). After that, the front-end controller 111 determines whether or not the management information 164 corresponding to the acquired ID is "Storage complete" (S62).

If the front-end controller 111 determines that the management information 164 corresponding to the acquired ID is "Storage complete" (Yes in S62), the front-end controller 111 writes the setting value 163 corresponding to the acquired ID into the current value storage area 151 of the volatile memory 150 as the setting value 153. The front-end controller 111 also writes the setting value 163 corresponding to the acquired ID into the saving area 152 of the volatile memory 150 as the setting value 154 (S63).

However, if the front-end controller 111 determines at step S62 that the management information 164 corresponding to the acquired ID is "Not stored" (No in S62), the front-end controller 111 transmits a default value request and the acquired ID to the memory controller 113. Upon receiving the default value request and the ID from the front-end controller 111, the memory controller 113 reads out the default value 165 corresponding to the received ID from the default value storage area 162 of the non-volatile memory 160 (S64). After that, the memory controller 113 transmits the read-out default value 165 to the front-end controller 111.

Upon receiving the default value 165 from the memory controller 113, the front-end controller 111 writes the received default value 165 into the current value storage area 151 of the volatile memory 150 as the setting value 153. The front-end controller 111 also writes the received default value 165 into the saving area 152 of the volatile memory 150 as the setting value 154 (S65).

When the front-end controller 111 completes step S63 and step S65, the front-end controller 111 determines whether or not the writing of setting values for all IDs has been completed (S66). If the front-end controller 111 determines that the writing of the setting values for all IDs has not been completed (No in S66), the processing returns to step S61 to perform writing of the setting value for the next ID. If, however, the front-end controller 111 determines that the writing of the setting values for all IDs has been completed (Yes in S66), the front-end controller 111 writes "Storage complete" into the management information 155 for all IDs in the saving area 152 (S67) and ends the processing.

In this manner, when the storage device 100 starts operating, the controller 110 reads out the setting values 163 and the management information 164 stored in the saved value storage area 161. If the management information 164 read out from the saved value storage area 161 indicates that the setting value 154 is stored in the saving area 152, the controller 110 writes the setting value 163 read out from the saved value storage area 161 into the current value storage area 151 and the saving area 152. If, however, the management information 164 read out from the saved value storage area 161 does not indicate that the setting value 154 has been stored in the saving area 152, the controller 110 reads out the default value 165 from the default value storage area 162 and writes the read-out default value 165 into the current value storage area 151 and the saving area 152.

Figure 10:
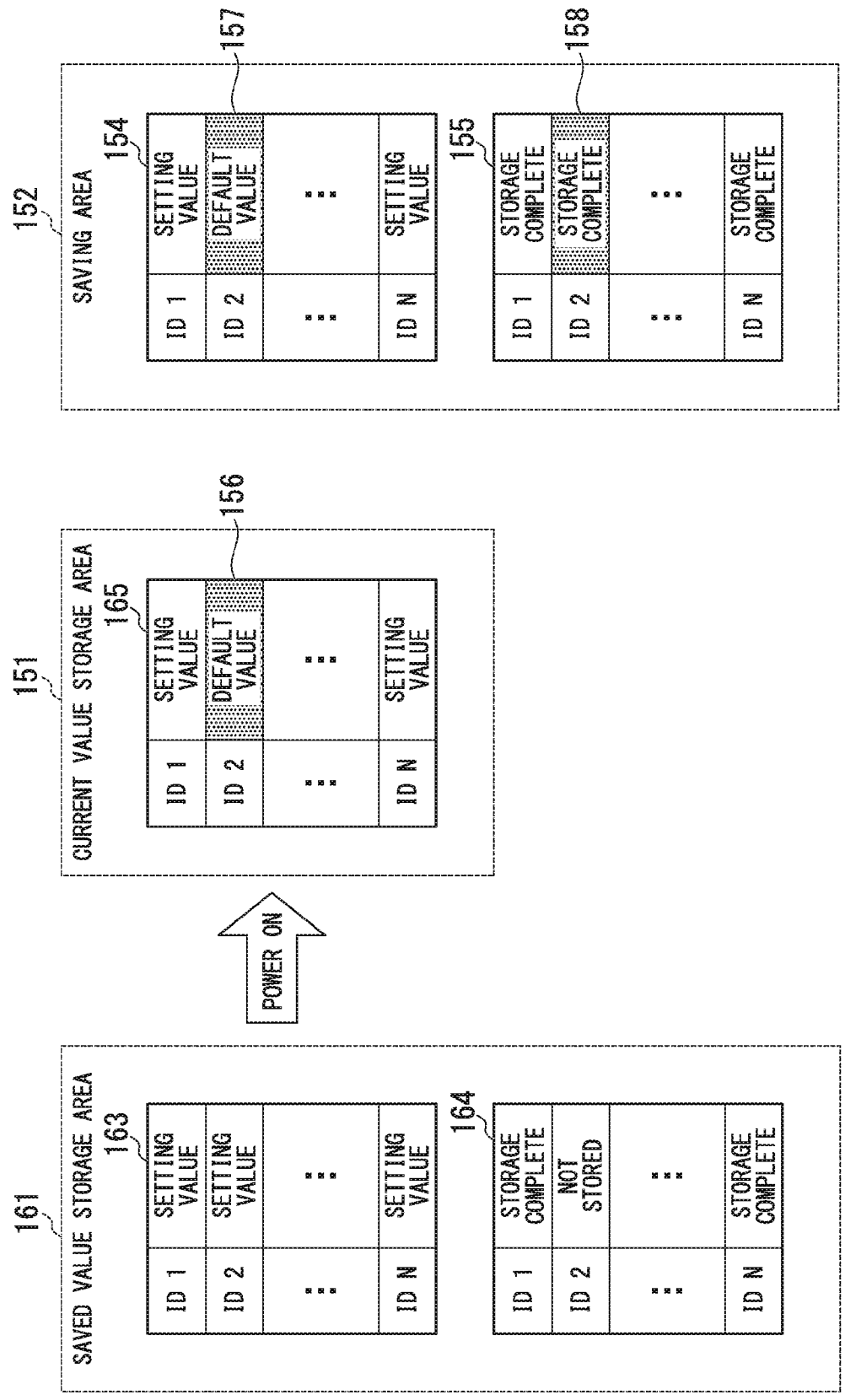
FIG. 10 shows an example of data in the volatile memory and data in the non-volatile memory when the storage device is started.

FIG. 10 shows an example of data in the volatile memory 150 and data in the non-volatile memory 160 when the storage device 100 starts operating. For example, if the setting value of ID2 is not stored in the saving area 152 and not saved to the saved value storage area 161 because of an improper power shutoff caused by a power outage, the management information 164 corresponding to ID2 in the saved value storage area 161 is "Not stored".

If the power of the storage device 100 is switched on this condition, because the management information 164 corresponding to ID2 in the saved value storage area 161 is "Not stored", the front-end controller 111 overwrites the setting value corresponding to ID2 in the current value storage area 151 with the default value 156, and overwrites the setting value corresponding to ID2 in the saving area 152 with the default value 157. The front-end controller 111 overwrites the management information 158 corresponding to ID2 with "Storage complete".

Thereby, the storage device 100 can operate based on default values in place of setting values that were not saved into the saving area 152, even if an improper power shutoff occurs because of, for example, a power outage, and some of the setting values are not saved into the saving area 152 and the saved value storage area 161.

Because there are a variety of settings made in the storage device 100 in response to the Set Features command, the host 200 frequently transmits the Set Features command to the storage device 100. Even if the storage device 100 of the present embodiment receives many Set Features commands from the host 200, the storage device 100 does not write setting values into the non-volatile memory 160 until the power supply from the main power supply unit 130 is stopped. For this reason, it is possible to reduce the frequency of writing to the non-volatile memory 160, and possible to extend the life of the non-volatile memory 160.

As described above, according to the first embodiment, if the controller 110 receives a Set Features command that includes a setting value from the host 200, the controller 110 writes the setting value included in the Set Features command into the volatile memory 150. If the power supply from the main power supply unit 130 is stopped, the controller 110 writes the setting values stored in the volatile memory 150 into the non-volatile memory 160 before the supply of power from the auxiliary power source 140 stops. This procedure can reduce the frequency of writing to the non-volatile memory 160, and enables extension of the life of the non-volatile memory 160.

(Second Embodiment)

In the first embodiment, if the front-end controller 111 determines that there is processing based on a Set Features command that is interrupted, the interrupted processing is always resumed (S54 and S55 in FIG. 8). In contrast, according to a second embodiment, only if the front-end controller 111 determines that the processing based on a Set Features command can be completed before the supply of power from the auxiliary power source 140 stops, the interrupted processing is resumed. The second embodiment will be described in detail below.

Figure 11:
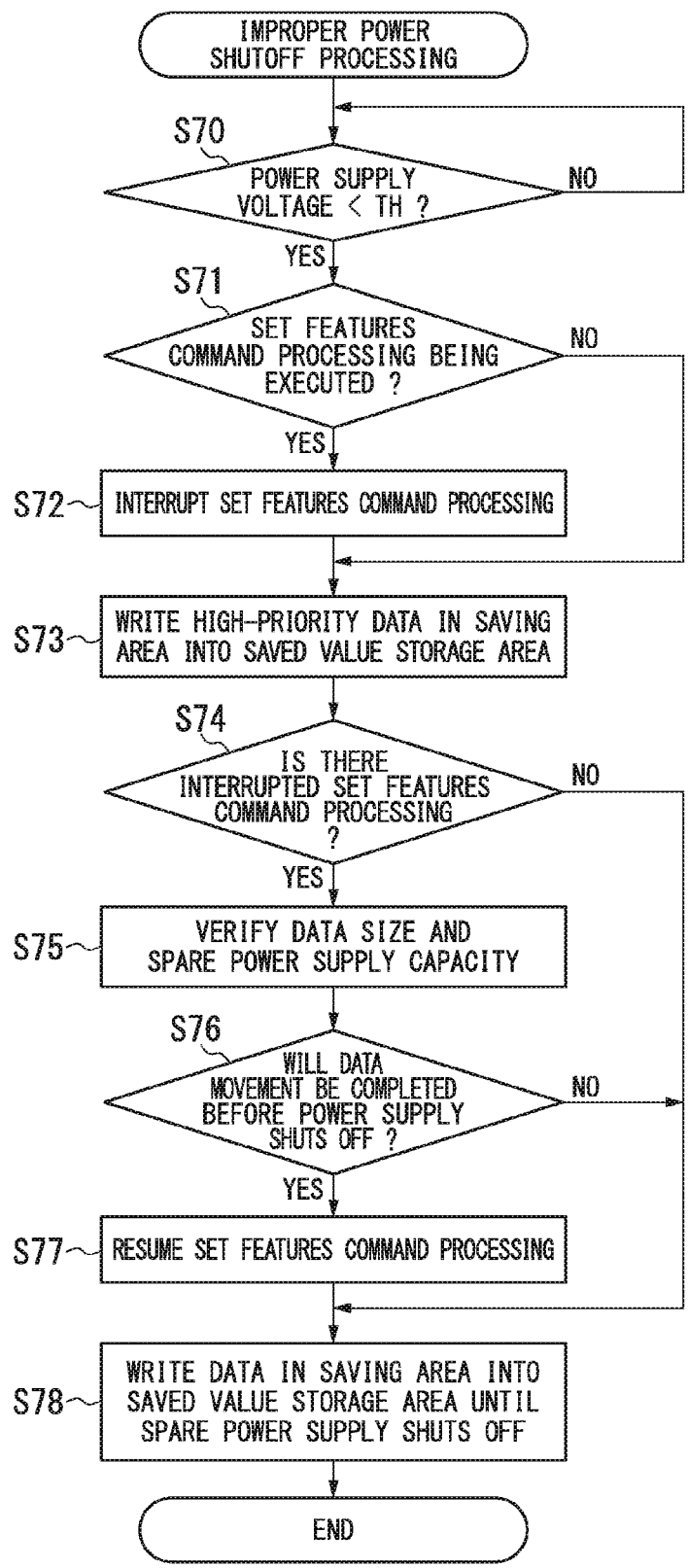
FIG. 11 is a flowchart showing processing carried out upon an improper power shutoff according to a second embodiment.

FIG. 11 is a flowchart showing processing carried out at the time of an improper power shutoff according to the second embodiment. The front-end controller 111 executes the processing shown in FIG. 6 and the processing shown in FIG. 11 in parallel.

First, the power supply voltage sensor 121 senses the voltage value of the main power supply 130. The power supply manager 120 transmits the voltage value sensed by the power supply voltage sensor 121 to the front-end controller 111. The front-end controller 111 determines whether or not the voltage value received from the power supply manager 120 is below the pre-established threshold TH (S70). If the front-end controller 111 determines that the voltage value received from the power supply manager 120 is not below the pre-established threshold TH (No in S70), the processing returns to step S70.

If, however, the front-end controller 111 determines that the voltage value sensed by the power supply voltage sensor 121 is below the threshold value TH (Yes in S70), the front-end controller 111 outputs a power supply switching request to the power supply manager 120. The power supply manager 120, based on the power supply switching request output from the front-end controller 111, switches the (primary) source of power to the storage device 100 from the main power supply unit 130 to the auxiliary power source 140. This procedure enables continued operation of the storage device 100 as long as power is supplied power from the auxiliary power source 140 to the storage device 100, even when an improper power shutoff occurs because of, for example, a power outage.

If the front-end controller 111 determines that the voltage value received from the power supply manager 120 is below the pre-established threshold TH (Yes in S70), the front-end controller 111 determines whether or not the processing based on the Set Features command is being executed (S71). If the front-end controller 111 determines that processing based on the Set Features command is not being executed (No in S71), the processing proceeds to step S73.

If, however, the front-end controller 111 determines that processing based on the Set Features command is being executed (Yes in S71), the processing based on the Set Features command is interrupted (S72). After that, the front-end controller 111 writes high-priority data in the saving area 152 into the saved value storage area 161 (S73).

Next, the front-end controller 111 determines whether or not there is processing based on a Set Features command that has been interrupted at step S72 (S74). If the front-end controller 111 determines that there is no interrupted processing based on a Set Features command (No in S74), the processing proceeds to step S78.

If, however, the front-end controller 111 determines that there is interrupted processing based on a Set Features command (Yes in S74), the front-end controller 111 verifies the size of data to be processed through the interrupted processing based on the Set Features command and remaining capacity (remaining electrical energy) of the auxiliary power source 140 (S75). The front-end controller 111 then, based on the verified data size and the remaining capacity (remaining electrical energy) of the auxiliary power source 140, determines whether or not transfer of data from the saving area 152 to the saved value storage area 161 can be completed before the power to the storage device 100 stops (S76).

If the front-end controller 111 determines that the transfer of data from the saving area 152 to the saved value storage area 161 cannot be completed before the power to the storage device 100 stops (No in S76), the processing proceeds to step S78. If, however, the front-end controller 111 determines that the transfer of data from the saving area 152 to the saved value storage area 161 can be completed before the power to the storage device 100 stops (Yes in S76), the front-end controller 111 resumes the interrupted processing based on the Set Features command (S77). After that, the memory controller 113 writes data in the saving area 152 into the saved value storage area 161, until power is no longer supplied from the auxiliary power source 140 (S78).

As described above, according to the second embodiment, after writing high-priority data into the saved value storage area 161, the controller 110 determines whether or not processing based on the Set Features command that has been interrupted can be completed before power supply from the auxiliary power source 140 stops. If the controller 110 determines that the interrupted processing based on the Set Features command can be completed before the power supply from the auxiliary power source 140 stops, the controller 110 resumes the interrupted processing based on the Set Features command. After the completion of the processing based on the Set Features command, the controller 110 writes the setting values 154 in the saving area 152 into the non-volatile memory 160. If, however, the controller 110 determines that the interrupted processing based on the Set Features command cannot be completed before the power supply from the auxiliary power source 140 stops, the interrupted processing based on the Set Features command is not resumed, and the setting values 154 in the saving area 152 are written into the non-volatile memory 160. This procedure prevents the power supply to the storage device 100 from stopping during execution of processing based on a Set Features command, and enables saving of the setting values 154 in the saving area 152 into the non-volatile memory 160.

(Third Embodiment)

In the first embodiment, if the front-end controller 111 determines that there is interrupted processing based on a Set Features command, the interrupted processing based on the Set Features command is always resumed (S54 and S55 in FIG. 8). In the second embodiment, the front-end controller 111 determines whether or not to resume the interrupted processing based on the Set Features command. In contrast, the front-end controller 111 according to a third embodiment writes setting values 154 in the saving area 152 into the non-volatile memory 160 without resuming the interrupted processing based on a Set Features command. The third embodiment will be described in detail below.

Figure 12:
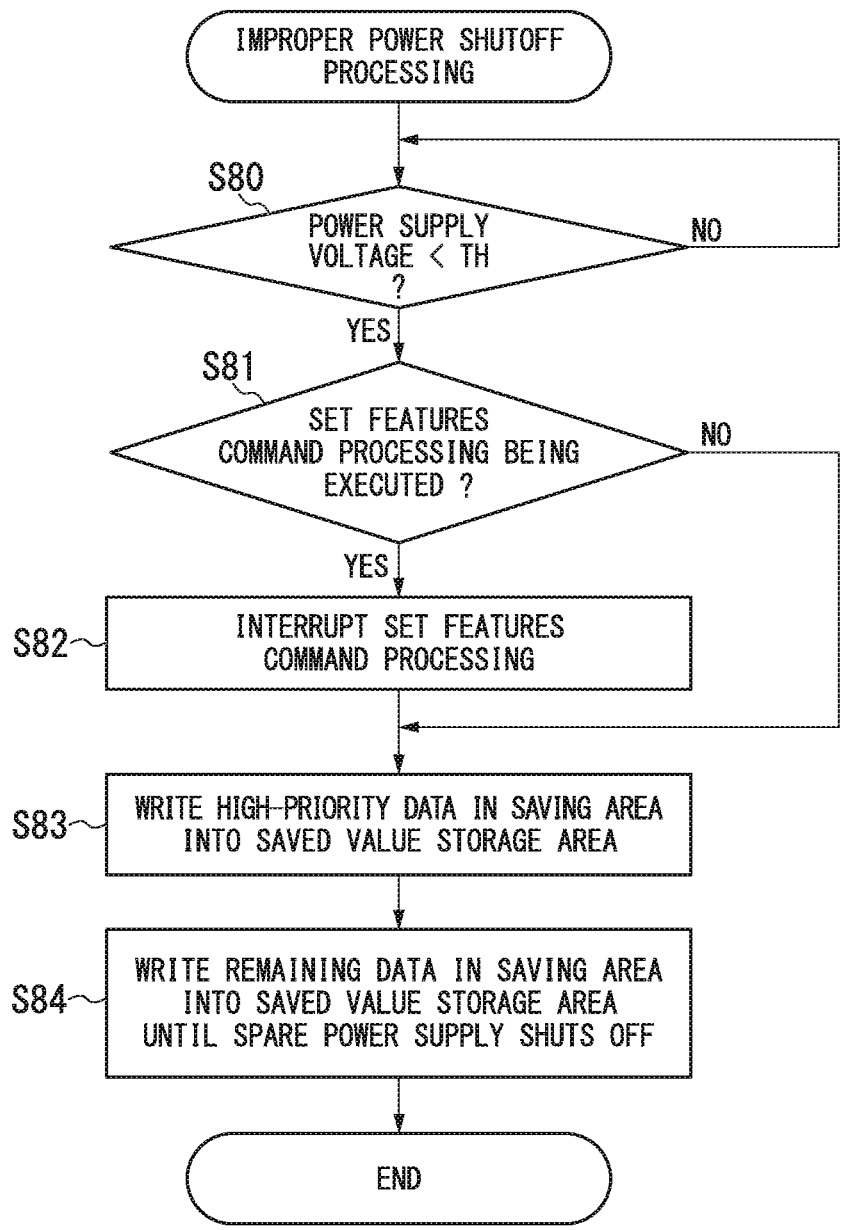
FIG. 12 is a flowchart showing processing carried out upon an improper power shutoff according to a third embodiment.

FIG. 12 is a flowchart showing processing carried out by the storage device 100 according to the third embodiment at the time of an improper power shutoff. The front-end controller 111 performs the processing shown in FIG. 6 and the processing shown in FIG. 12 in parallel.

First, the power supply voltage sensor 121 senses the voltage value of main power supply unit 130. The power supply manager 120 transmits the voltage value sensed by the power supply voltage sensor 121 to the front-end controller 111. The front-end controller 111 determines whether or not the voltage value received from the power supply manager 120 is below the pre-established threshold TH (S80). If the front-end controller 111 determines that the voltage value received from the power supply manager 120 is not below the pre-established threshold TH (No in S80), the processing returns to step S80.

If, however, the front-end controller 111 determines that the voltage value sensed by the power supply voltage sensor 121 is below the threshold value TH (Yes in S80), the front-end controller 111 outputs a power supply switching request to the power supply manager 120. The power supply manager 120, based on the power supply switching request output from the front-end controller 111, switches the (primary) source of power to the storage device 100 from the main power supply unit 130 to the auxiliary power source 140. This procedure enables continued operation of the storage device 100 as long as power is supplied power from the auxiliary power source 140 to the storage device 100, even when an improper power shutoff occurs because of, for example, a power outage.

If the front-end controller 111 determines that the voltage value received from the power supply manager 120 is below the pre-established threshold TH (Yes in S80), the front-end controller 111 determines whether or not processing based on the Set Features command is being executed (S81). If the front-end controller 111 determines that processing based on the Set Features command is not being executed (No in S81), the processing proceeds to step S83.

If, however, the front-end controller 111 determines that the processing based on the Set Features command is being executed (Yes in 82), the processing based on the Set Features command is interrupted (S82). Next, the front-end controller 111 writes high-priority data stored in the saving area 152 into the saved value storage area 161 (S83). After that, the memory controller 113 writes as much data in the saving area 152 as possible into the saved value storage area 161 until the supply of power from the auxiliary power source 140 stops (S84).

As described above, according to the third embodiment, the controller 110, after saving high-priority data into the saved value storage area 161, writes the setting values 154 in the saving area 152 into the non-volatile memory 160 without resuming the processing based on a Set Features command that has been interrupted. This procedure can prevent the power supply of the storage device 100 from being stopped during execution of the processing based on the Set Features command, and enables saving of setting values 154 in the saving area 152 into the non-volatile memory 160. According to the third embodiment, because the step (S75 in FIG. 11) to verify the data size and the remaining capacity (remaining electrical energy) of the auxiliary power source 140 is not required, the processing time can be shortened, and it is possible to save more of the setting values 154 in the saving area 152 into the non-volatile memory 160.

In the flowcharts of FIG. 8, FIG. 11, and FIG. 12, when the power supply from the main power supply unit 130 of the storage device 100 is stopped, the high-priority data are written into the saved value storage area 161 first. However, the type of data stored first is not limited thereto. For example, if the power supply from the main power supply unit 130 of the storage device 100 is to be stopped, the front-end controller 111 may write a transaction log indicating the transaction processing history into the non-volatile memory 160 before the high-priority data. This procedure enables the storage device 100 to reliably restore data using the transaction log, when the power supply from the main power supply unit 130 of the storage device 100 is restarted again.

At this point, the transaction processing will be described. If the storage device 100 receives a plurality of write commands as a series of processing, there are cases in which read-out of data is permitted only after all write commands have been executed. This series of processing is referred to as transaction processing. The series of processing is one grouping of processing. Receiving "as a series of processing" may be reception of a plurality of write commands correctively through one process, or reception of a plurality of write commands each of which has common information affixed thereto (for example, transaction processing identification information) indicating the series of processing. Also, the receiving "as a series of processing" may be reception of a command requesting transaction processing, which includes identification information of a plurality of commands that are to be subsequently transmitted, and then reception of the plurality of commands having the identification information.

Figure 13:
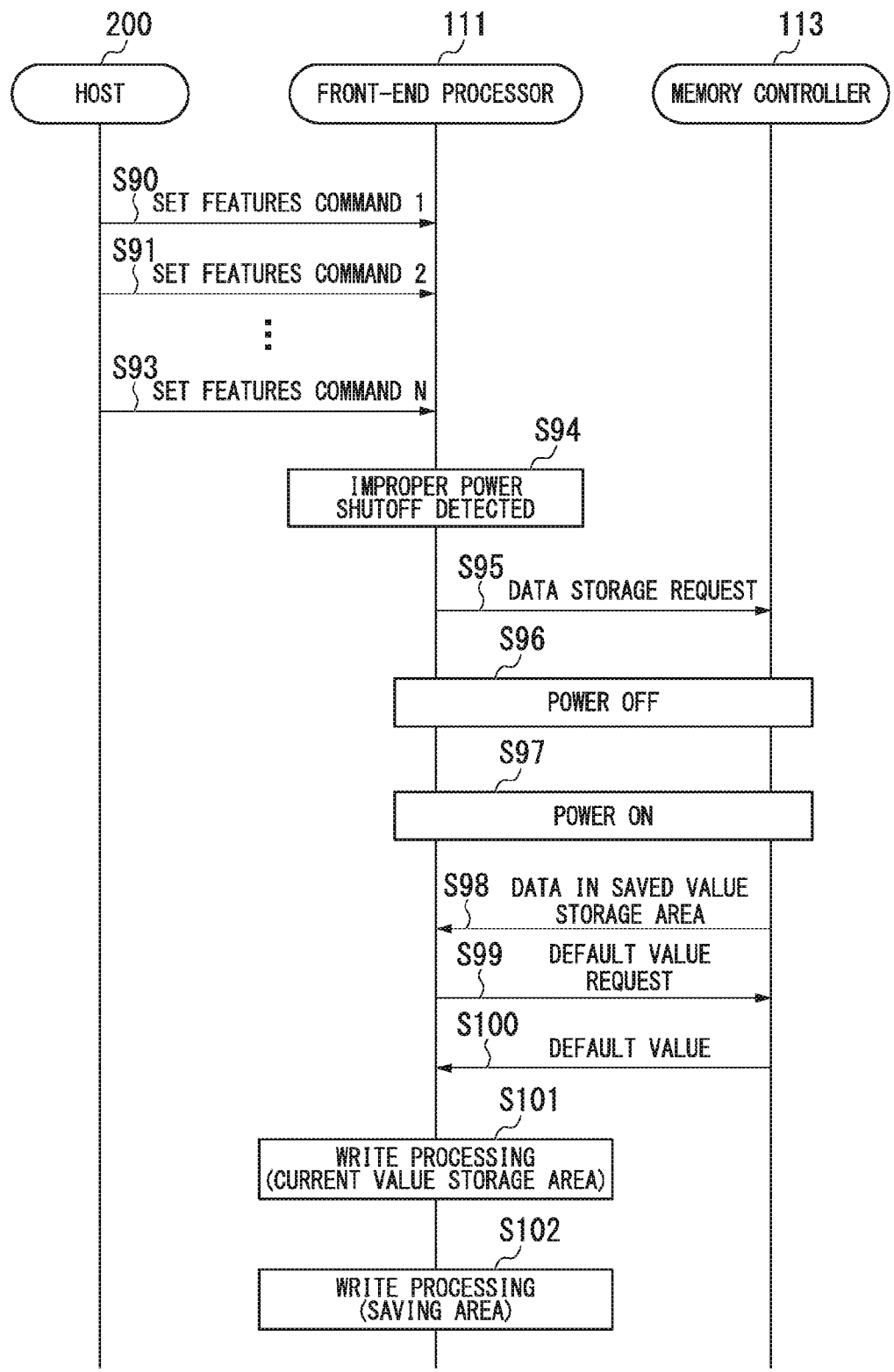
FIG. 13 is a sequence diagram showing an operation of a storage device and a host.

FIG. 13 is a sequence diagram showing an example of operation carried out by the storage system including the storage device 100 and the host 200. FIG. 13 shows the operation of the storage device 100 when the host 200 transmits a large number of Set Features commands to the storage device 100.

The host 200 transmits Set Features commands 1 to N (where N is a natural number) to the front-end controller 111 (S90, S91, and S93). If the front-end controller 111 receives the Set Features commands 1 to N from the host 200, a great amount of time may be required to complete the processing with respect to all of the Set Features commands 1 to N.

If the front-end controller 111 senses an improper power shutoff of the storage device 100 because of, for example, a power outage before the completion of the processing based on the Set Features commands 1 to N (S94), the front-end controller 111 interrupts the processing based on the Set Features commands. After that, the front-end controller 111 transmits a data storage request to the memory controller 113 (S95).

The memory controller 113, based on the data storage request received from the front-end controller 111, reads setting values 154 and the management information 155 from the saving area 152 of the volatile memory 150. The memory controller 113 writes the setting values 154 and management information 155 read from the saving area 152 as the setting values 163 and the management information 164, respectively, into the saved value storage area 161 of the non-volatile memory 160.

When the power is no longer supplied from the auxiliary power source 140, the power supply to the storage device 100 stops (S96). After that, when the power supply to the storage device 100 starts again (S97), the memory controller 113 transmits the setting values 163 and the management information 164 stored in the saved value storage area 161 to the front-end controller 111. Upon receiving the management information 164 from the memory controller 113, the front-end controller 111 transmits the default value request for IDs for which management information 164 is "Not stored" to the memory controller 113 (S99). Upon receiving the default value request from the front-end controller 111, the memory controller 113 transmits the default values 165 to the front-end controller 111 (S100).

The front-end controller 111 writes the setting values 163 received from the memory controller 113 at step S98 and the default values 165 received from the memory controller 113 at step S100 into the current value storage area 151 of the volatile memory 150 as the setting values 153 (S101). The front-end controller 111 writes the setting values 163 and the default values 165 into the saving area 152 of the volatile memory 150 as the setting values 154 (S102).

In this manner, if the controller 110 receives a Set Features command that includes a setting value from the host 200, the controller 110 writes the setting value included in the Set Features command into the saving area 152 of the volatile memory 150. If the power supply from the main power supply unit 130 of the storage device 100 is stopped before the setting value 154 being stored into the saving area 152 of the volatile memory 150, after the storage device 100 is started, the controller 110 reads out the default value 165 from the default value storage area 162 of the non-volatile memory 160. The controller 110 then writes the default value 165 into the current value storage area 151 and the saving area 152 of the volatile memory 150 in place of the setting value 154. This procedure enables the storage device 100 to perform operation settings using the default value, even if some of the setting values had not been saved into the saving area 152 and in the saved value storage area 161 because of an improper power shutoff caused by, for example, a power outage.

Although the memory 150 is a volatile memory in the first to third embodiments, the memory 150 may be a non-volatile memory. For example, although the storage device 100 is an SSD in the first to third embodiments, the storage device 100 may be an SSHD (solid-state hybrid drive). An SSHD has a large-capacity HDD (hard-disk drive) for storing data and a NAND-type flash memory as a cache.

Figure 14:
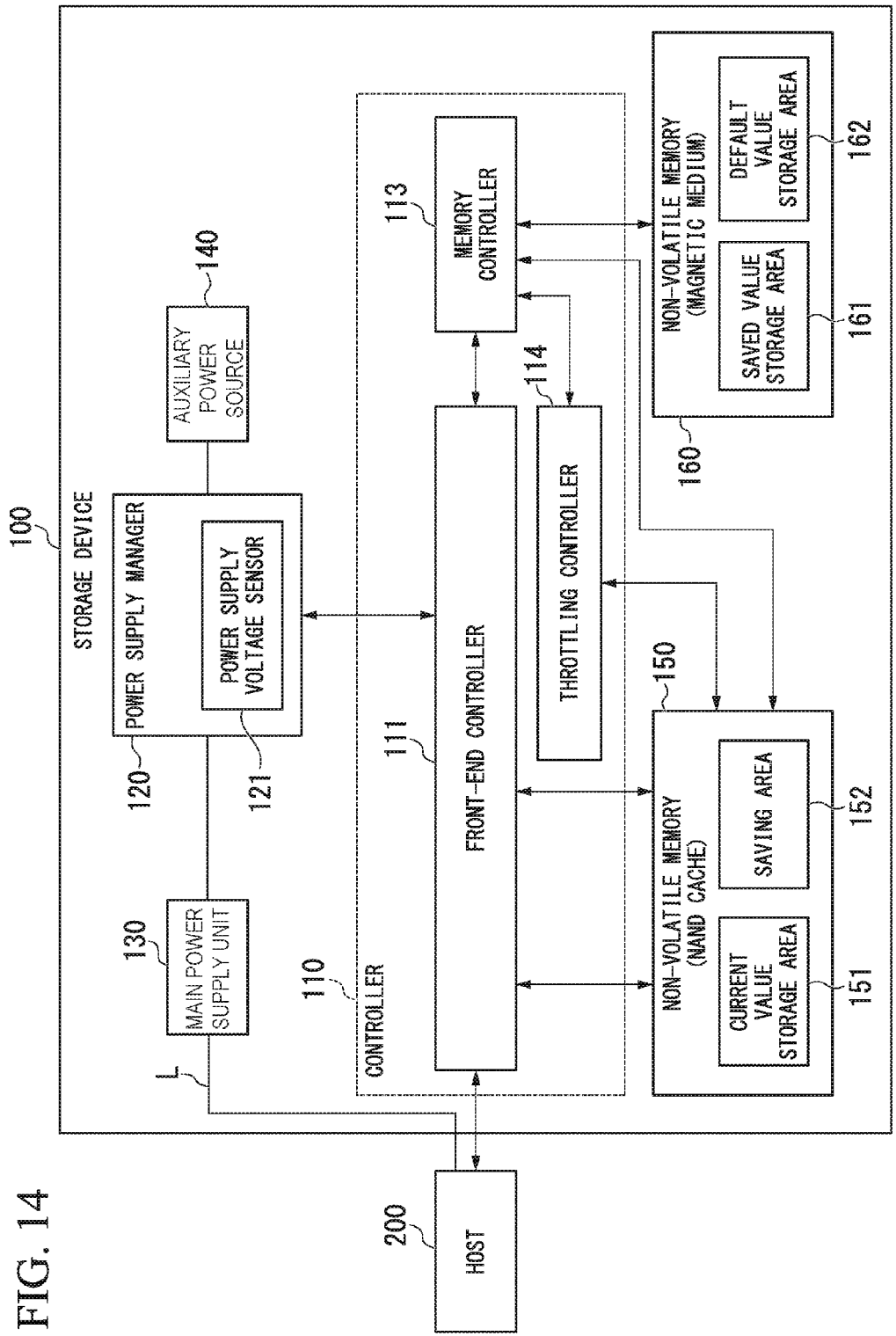
FIG. 14 shows an example of a storage device when the storage device is an SSHD.

FIG. 14 shows an example of a storage system in which the storage device 100 is an SSHD. The storage device 100 has a non-volatile memory 150 and a non-volatile memory 160. The non-volatile memory 150 is a NAND-type flash memory, but is not limited thereto. For example, the non-volatile memory 150 may be a bit cost scalable (BiCS) memory, a magnetoresistive memory (MRAM), a phase-change memory (PcRAM), a resistive random-access memory (RRAM®), or a combination thereof. The non-volatile memory 160 is a magnetic disk (magnetic medium) such as a hard-disk drive. The non-volatile memory 150 has a current value storage area 151 and a saving area 152. The non-volatile memory 160 has a saved value storage area 161 and the default value storage area 162. The data structure in the non-volatile memory 150 is the same as the data structure in the volatile memory 150 shown in FIG. 2. The data structure in the non-volatile memory 160 is the same as the data structure in the non-volatile memory 160 shown in FIG. 3. The storage device 100 according to this configuration can reduce frequency of writing into the non-volatile memory 160 and extend the life of the non-volatile memory 160, even if the storage device 100 is an SSHD.

(Fourth Embodiment)

In the first to the third embodiments, the current value storage area 151 and the saving area 152 are provided separately in the volatile memory 150. In contrast, in a fourth embodiment, the current value storage area 151 is provided in the saving area 152. The fourth embodiment will be described below in detail.

Figure 15:
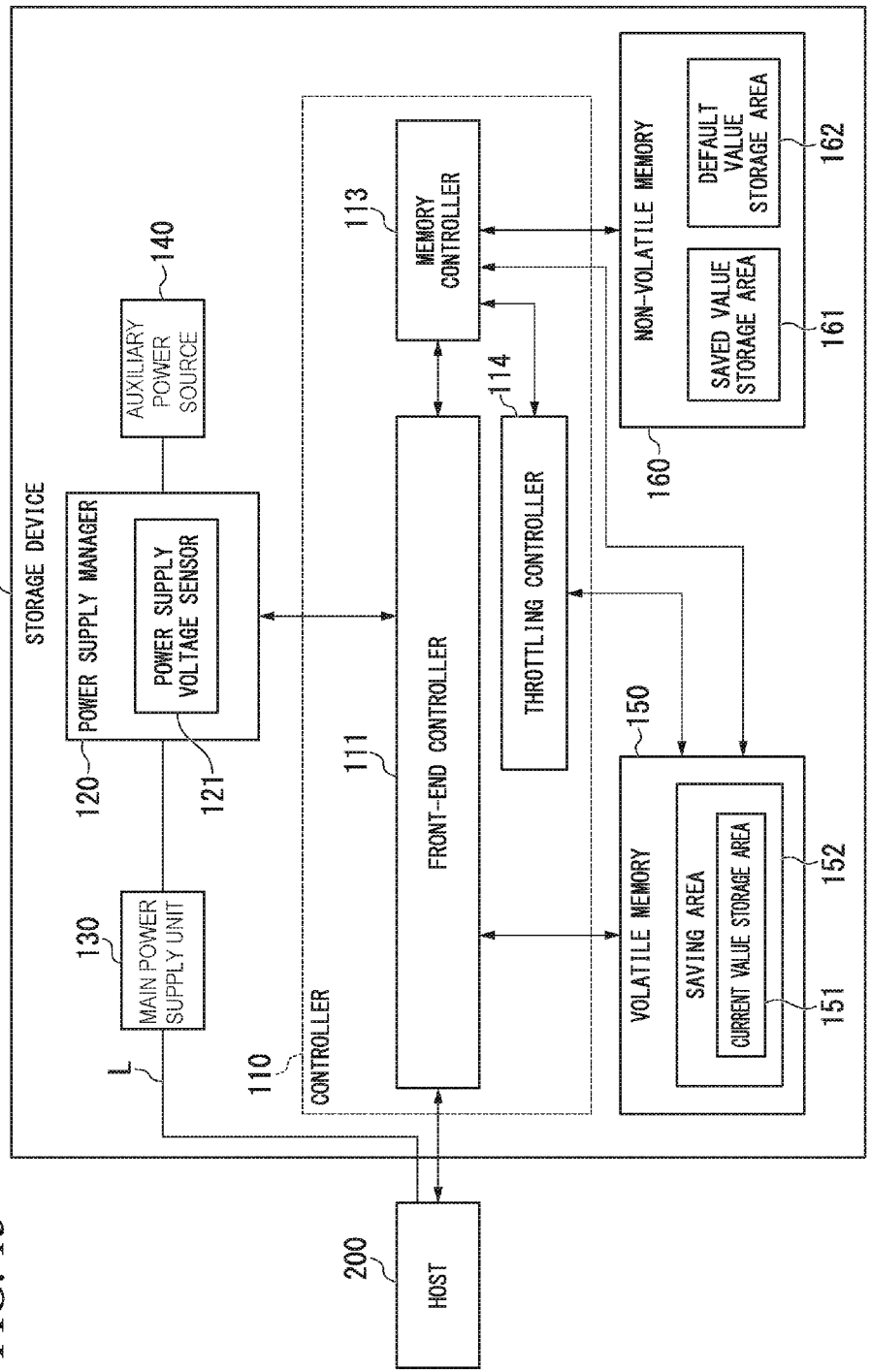
FIG. 15 shows an example of a storage device according to a fourth embodiment.

FIG. 15 shows an example of a storage device according to the fourth embodiment. The following description concentrates on differences between FIG. 1 and FIG. 15. The host 200 transmits commands, such as a read command, a write command, a delete command, and a setting command, to the storage device 100. The front-end controller 111 receives the commands from the host 200 and controls the writing of data into the current value storage area 151 of the volatile memory 150. Because the current value storage area 151 is included in the saving area 152, if the power to the storage device 100 is shut off, all data stored in the current value storage area 151 are stored into the saved value storage area 161 of the non-volatile memory 160.

Figure 16:
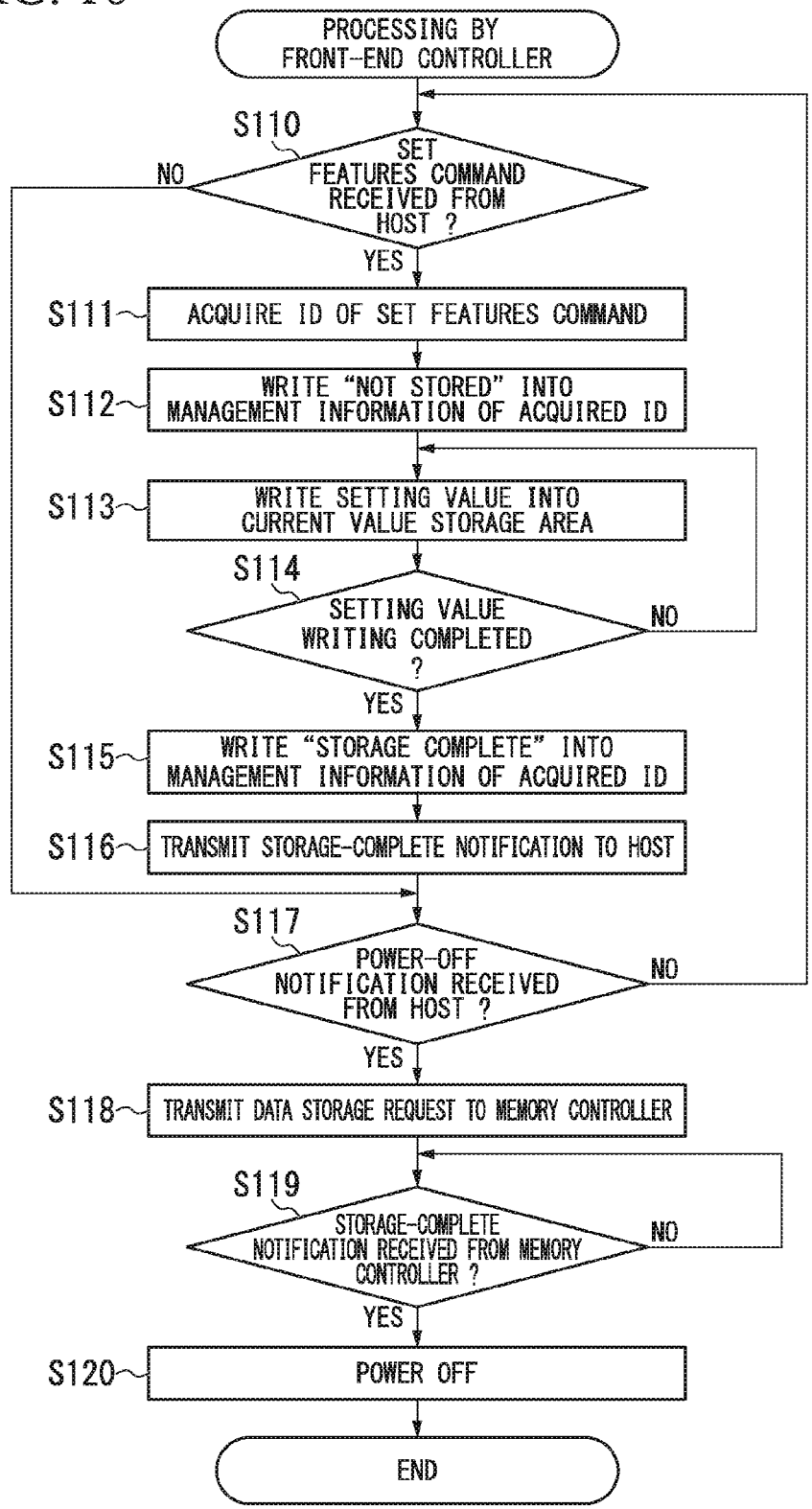
FIG. 16 is a flowchart showing processing carried out by a front-end controller of the storage device according to the fourth embodiment.

FIG. 16 is a flowchart showing processing carried out by the front-end controller according to the fourth embodiment. First, the front-end controller 111 determines whether or not a Set Features command transmitted from the host 200 has been received (S110). If the front-end controller 111 determines that no Set Features command has been received (No in S110), the processing proceeds to step S117. If the front-end controller 111 determines that the Set Features command has been received (Yes in S110), the front-end controller 111 acquires an ID from the second field F2 of the received Set Features command (S111).

Next, the front-end controller 111 writes "Not stored" into the management information 155 stored in the current value storage area 151 corresponding to the acquired ID. For example, if the ID acquired from the second field F2 of the Set Features command is 2, as shown in FIG. 2, "Not stored" is written into the management information 155 corresponding to ID2 in the current value storage area 151 (S112). After that, the front-end controller 111 writes the setting value acquired from the third field F3 of the Set Features command into the current value storage area 151 as the setting value 153 corresponding to ID2 (S113).

Next, the front-end controller 111 determines whether or not the writing of the setting value into the current value storage area 151 has been completed (S114). If the front-end controller 111 determines that the writing of the setting value into the current value storage area 151 has not been completed (No in S114), the processing returns to step S113. If, however, the front-end controller 111 determines that the writing of the setting value into the current value storage area 151 has been completed (Yes in S114), the front-end controller 111 writes "Storage complete" into the management information 155 of the acquired ID (S115). After that, the front-end controller 111 transmits a storage-complete notification to the host 200 (S116).

Next, the front-end controller 111 determines whether or not a power-off notification has been received from the host 200 (S117). If the front-end controller 111 determines that no power-off notification has been received from the host 200 (No in S117), the processing returns to step S110. If, however, the front-end controller 111 determines that the power-off notification has been received from the host 200 (Yes in S117), the front-end controller 111 transmits a data storage request to the memory controller 113 (S118).

Next, the front-end controller 111 determines whether or not a storage-complete notification has been received from the memory controller 113 (S119). If the front-end controller 111 determines that no storage-complete notification has been received from the memory controller 113 (No in S119), the processing returns to step S119. If, however, the front-end controller 111 determines that the storage-complete notification has been received from the memory controller 113 (Yes in S119), the front-end controller 111 transmits a power-off notification to the power supply manager 120. Upon receiving the power-off notification from the front-end controller 111, the power supply manager 120 shuts off the main power supply unit 130 (S120) and ends the processing.

As described above, according to the fourth embodiment, the current value storage area 151 is provided in the saving area 152. Because the controller 110 need not write setting values into both the current value storage area 151 and the saving area 152, it is possible to simplify the control of the controller 110.

(Fifth Embodiment)

In the first embodiment through the fourth embodiment, the front-end controller 111, the throttling controller 114, and the volatile memory 150 are provided in the storage device 100. In contrast, according to a fifth embodiment, the front-end controller 111, the throttling controller 114, and the volatile memory 150 are not included in the storage device 100. Instead, a central controller 210, a throttling controller 220, and a volatile memory 230 are provided in the host 200. The fifth embodiment will be described in detail below.

Figure 17:
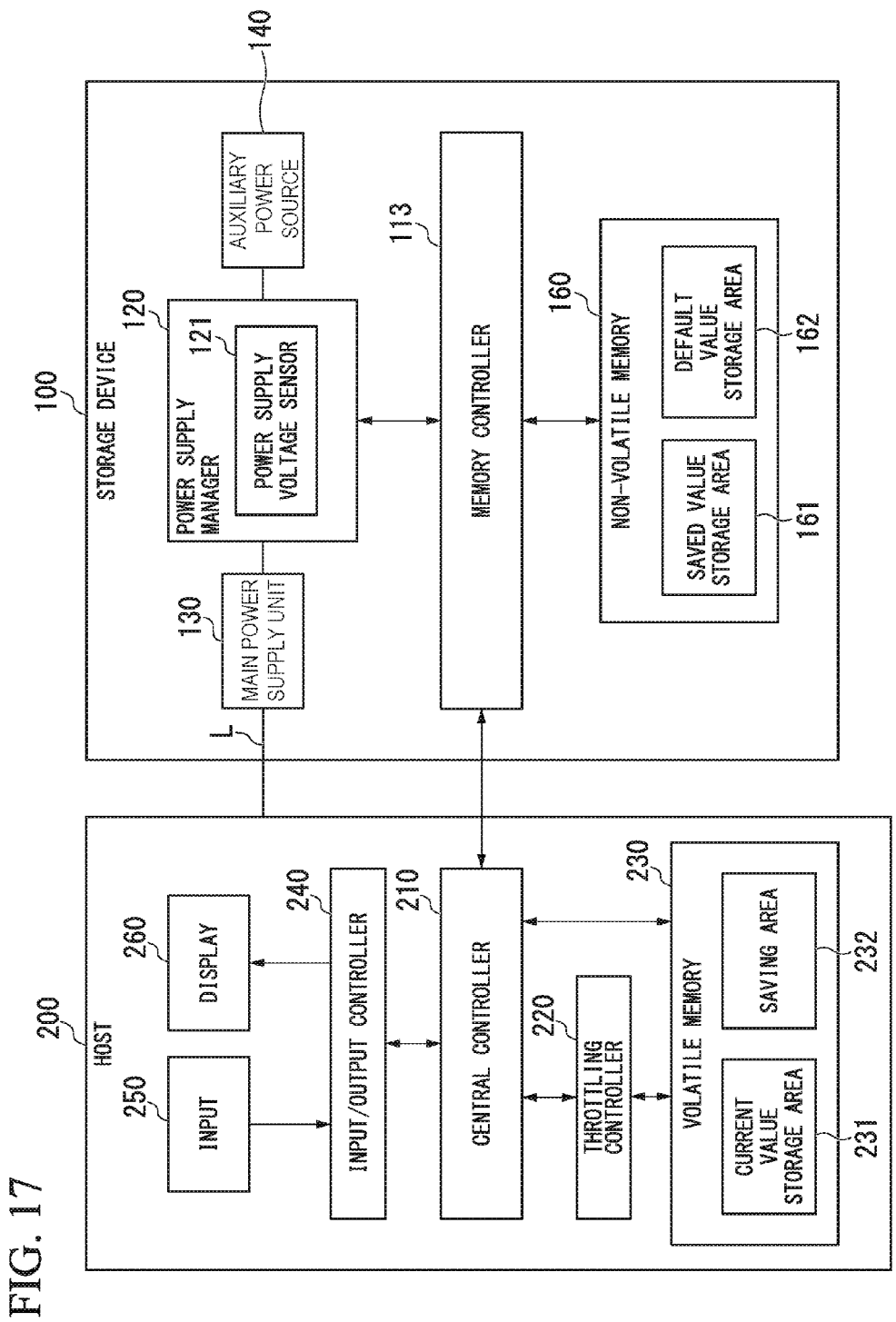
FIG. 17 shows an example of a storage system, including a host and a storage device, according to a fifth embodiment.

FIG. 17 shows an example of a storage system according to the fifth embodiment. The following description concentrates on the differences between FIG. 1 and FIG. 17. The host 200 has the central controller 210, the throttling controller 220, the volatile memory 230, an input/output controller 240, an input 250, and a display 260.

The volatile memory 230 temporarily stores setting values for operation of the storage device 100. The volatile memory 230 may be various types of RAM, such as DRAM. The volatile memory 230 has a current value storage area 231 for storing setting values currently set in the storage device 100 and a saving area 232 for storing setting values that will be saved into the non-volatile memory 160. The data structure of the volatile memory 230 is the same as the data structure of the volatile memory 150 shown in FIG. 2.

The central controller 210 controls the writing of data to the current value storage area 231 and the saving area 232 of the volatile memory 230. The throttling controller 220, based on a setting value (for example, the throttling amount) stored in the current value storage area 231 of the volatile memory 230, controls the frequency of the predetermined processing performed by the memory controller 113 with respect to the non-volatile memory 160.

The input 250 is an input device such as a keyboard or mouse. The display 260 is a display device such as a liquid-crystal display. The input/output controller 240 acquires information input from the input 250 and transmits the acquired information to the central controller 210. For example, if an instruction for setting an operation of the storage device 100 is input from the input 250, the input/output controller 240 generates a Set Features command based on the input instruction. The input/output controller 240 transmits the generated Set Features command to the central controller 210. If an instruction for stopping the power supply of the storage device 100 is input from the input 250, the input/output controller 240 transmits a power-off notification to the central controller 210.

The input/output controller 240 transmits information received from the central controller 210 to the display 260. If the display 260 receives the information from the input/output controller 240, the display 260 displays the received information.

Figure 18:
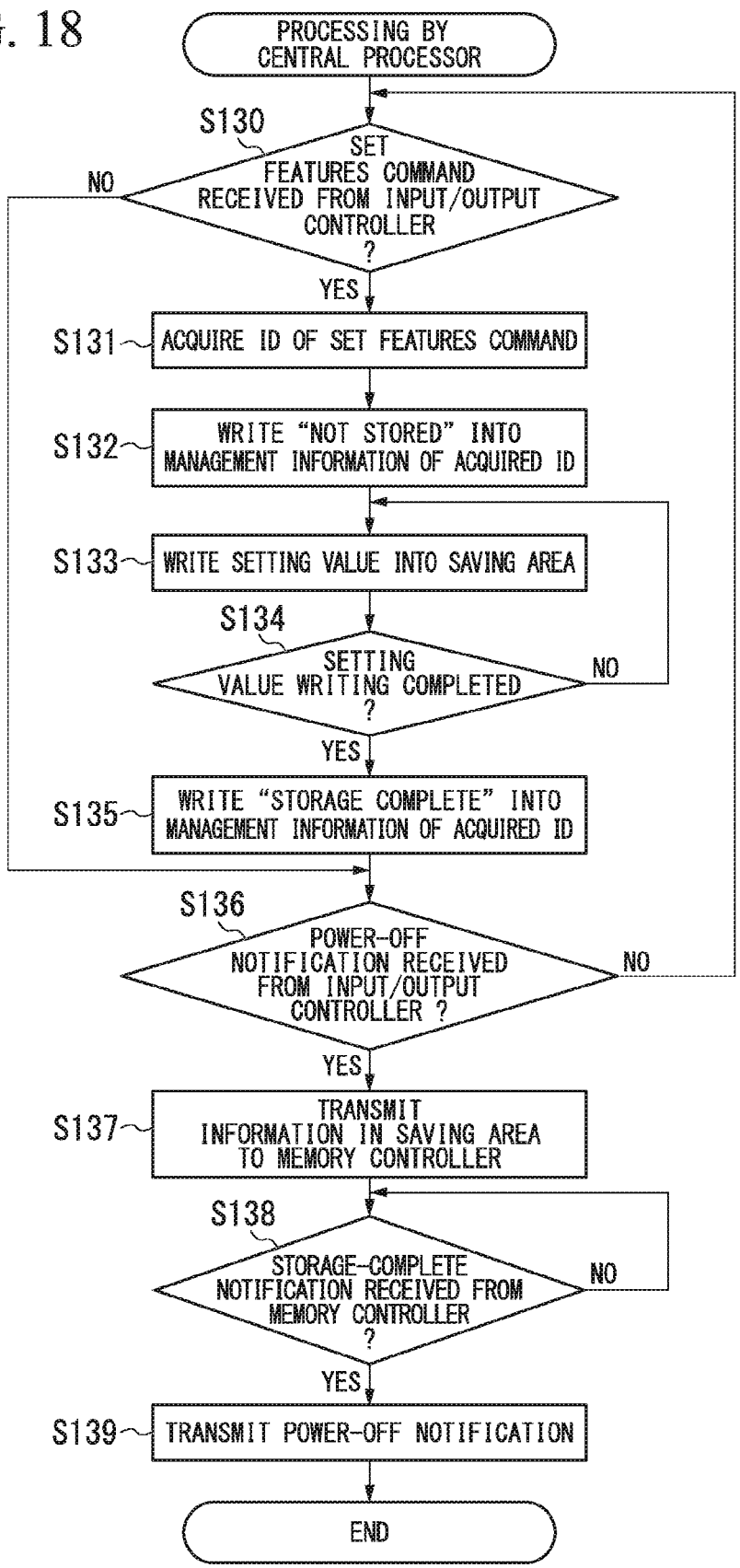
FIG. 18 is a flowchart showing processing carried out by a central controller of a host according to the fifth embodiment.

FIG. 18 is a flowchart showing processing carried out by the central controller 210 according to the fifth embodiment. First, the central controller 210 determines whether or not a Set Features command transmitted from the input/output controller 240 has been received (S130). If the central controller 210 determines that no Set Features command has been received (No in S130), the processing proceeds to step S136. If the central controller 210 determines that the Set Features command has been received (Yes in S130), the central controller 210 acquires the ID from the second field F2 of the received Set Features command (S131).

Next, the central controller 210 writes "Not stored" into the management information 155 stored in the saving area 232 of the volatile memory 230 corresponding to the acquired ID. For example, if the ID acquired from the second field F2 of the Set Features command is 2, as shown in FIG. 2, the management information 155 corresponding to ID2 in the saving area 232 is overwritten with "Not stored" (S132). After that, the central controller 210 writes the setting value acquired from the third field F3 of the Set Features command into the saving area 232 as the setting value 154 corresponding to ID2 (S133).

Next, the central controller 210 determines whether or not the writing of the setting value to the saving area 232 has been completed (S134). If the central controller 210 determines that the writing of the setting value into the saving area 232 has not been completed (No in S134), the processing returns to step S133. If, however, the central controller 210 determines that the writing of the setting value into the saving area 232 has been completed (Yes in S134), the central controller 210 overwrites the management information 155 of the acquired ID with "Storage complete" (S135).

After that, the central controller 210 determines whether or not a power-off notification has been received from the input/output controller 240 (S136). If the central controller 210 determines that no power-off notification has been received from the input/output controller 240 (No in S136), the processing returns to step S130. If, however, the central controller 210 determines that the power-off notification has been received from the input/output controller 240 (Yes in S136), the central controller 210 transmits the setting value 154 and the management information 155 stored in the saving area 232 to the memory controller 113 (S137).

Next, the central controller 210 determines whether or not a storage-complete notification has been received from the memory controller 113 (S138). If the central controller 210 determines that no storage-complete notification has been received from the memory controller 113 (No in S138), the processing returns step S138. If, however, the central controller 210 determines that the storage-complete notification has been received from the memory controller 113 (Yes in S138), the central controller 210 transmits a power-off notification to the memory controller 113 (S139), and ends the processing.

Figure 19:
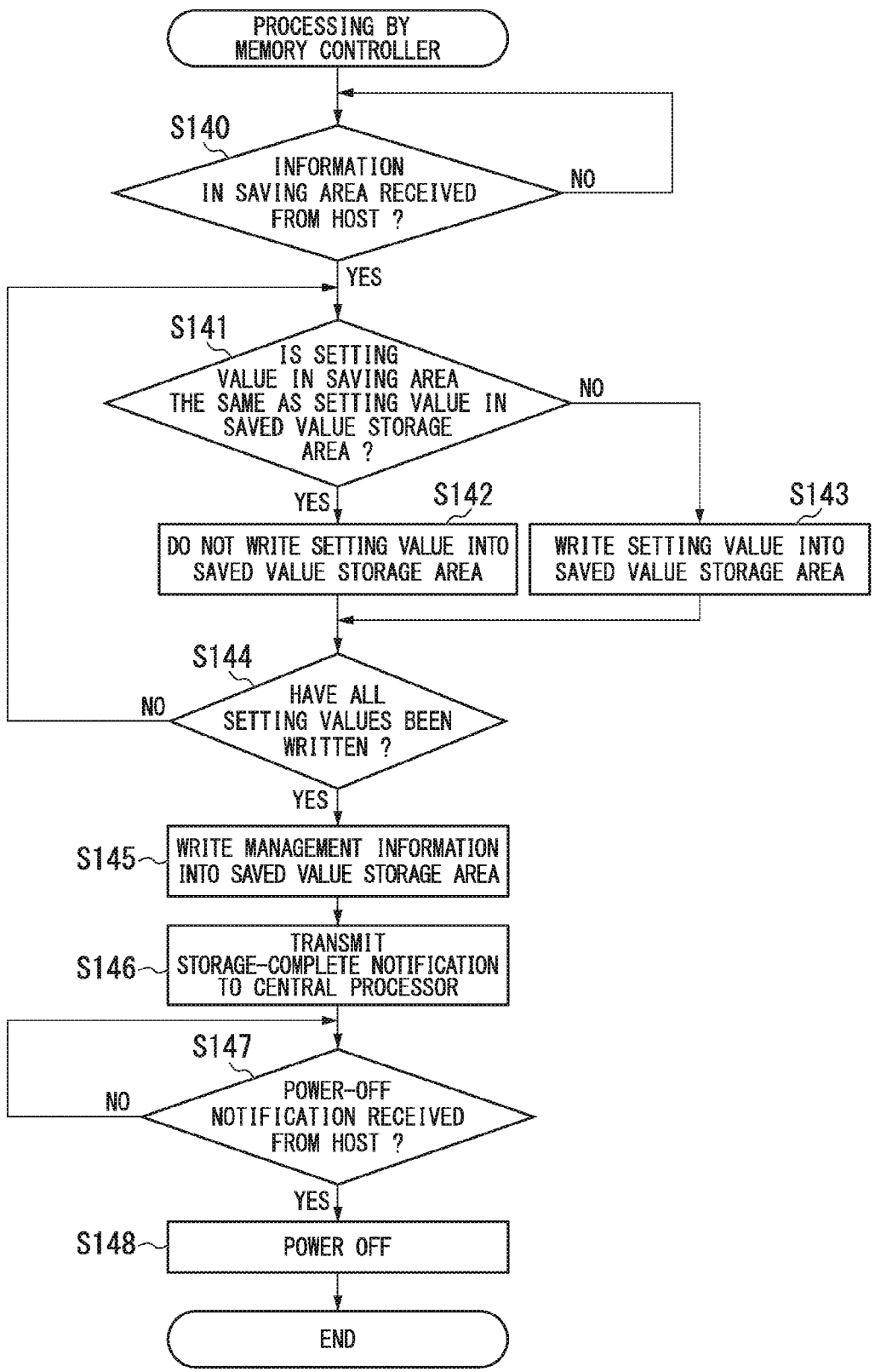
FIG. 19 is a flowchart showing processing carried out by a memory controller of a storage device according to the fifth embodiment.

FIG. 19 is a flowchart showing processing carried out by the memory controller 113 according to the fifth embodiment. First, the memory controller 113 determines whether or not setting values 154 and management information 155 stored in the saving area 232 and transmitted at step S137 of FIG. 18 have been received from the central controller 210 (S140). If the memory controller 113 determines that no setting values 154 and no management information 155 have been received from the central controller 210 (No in S140), the processing returns to step S140.

If, however, the memory controller 113 determines that the setting values 154 and the management information 155 have been received from the central controller 210 (Yes in S140), the memory controller 113 determines whether or not the setting value 154 (setting values 154 in the saving area 232) and the setting value 163 stored in the saved value storage area 161 are the same (S141). If the memory controller 113 determines that the setting value 154 received from the central controller 210 and the setting value 163 stored in the saved value storage area 161 are the same (Yes in S141), the memory controller 113 does not write the setting value 154 received from the central controller 210 into the saved value storage area 161 (S142).

In this manner, even if power supply from the main power supply unit 130 of the storage device 100 stops, if the setting value 154 stored in the saving area 232 and the setting value 163 stored in the saved value storage area 161 are the same, the memory controller 113 does not write the setting value 154 stored in the saving area 232 into the saved value storage area 161. This procedure can reduce the frequency of the memory controller 113 writing data into the non-volatile memory 160 and extend the life of the non-volatile memory 160.

If, however, the memory controller 113 determines that the setting value 154 received from the central controller 210 and the setting value 163 stored in the saved value storage area 161 are different (No in S141), the memory controller 113 writes the setting value 154 received from the central controller 210 into the saved value storage area 161 (S143).

After the processing step S142 and step S143, the memory controller 113 determines whether or not all setting values in the saving area 232 have been written into the saved value storage area 161 (S144). If the memory controller 113 determines that all setting values in the saving area 232 have not been written into the saved value storage area 161 (No in S144), the processing returns to step S141 in order to write the setting value for the next ID.

If, however, the memory controller 113 determines that all setting values in the saving area 232 have been written into the saved value storage area 161 (Yes in S144), the management information 155 received from the central controller is written into the saved value storage area 161 as the management information 164 (S145). After that, the memory controller 113 transmits a storage-complete notification to the central controller 210 (S146).

Next, the memory controller 113 determines whether or not a power-off notification has been received from the host 200 (S147). If the memory controller 113 determines that no power-off notification has been received from the host 200 (No in S147), the processing returns to step S147. If, however, the memory controller 113 determines that the power-off notification has been received from the host 200 (Yes in S147), the memory controller 113 transmits the power-off notification to the power supply manager 120. Upon receiving the power-off notification from the memory controller 113, the power supply manager 120 shuts off the power supply from the main power supply unit 130 (S148), and the processing ends.

As described above, according to the fifth embodiment, the host 200 has a volatile memory 230 and a central controller 210. The volatile memory 230 stores the setting values 154 of the storage device 100 connected to the host 200. If power supply from the main power supply unit 130 of the storage device 100 is to be stopped, the central controller 210 transmits the setting values 154 stored in the volatile memory 230 to the storage device 100. The storage device 100 has a non-volatile memory 160 and a memory controller 113. If the power supply from the main power supply unit 130 of the storage device 100 is to be stopped, the memory controller 113 writes the setting values 154 received from the central controller 210 into the non-volatile memory 160 before supply of power to the storage device 100 stops. This procedure can reduce frequency of writing into the non-volatile memory 160 and extend the life of the non-volatile memory 160.

In the first embodiment to the fifth embodiment, although the size of the saving area has not been specified, the controller 110 may set the size of the saving area in accordance with the remaining capacity (remaining electrical energy) of the auxiliary power source 140. For example, the controller 110 may calculate the amount of time that the storage device 100 can be operated based on the remaining capacity of the auxiliary power source 140 and set the size of the saving area in accordance with the calculated time. Specifically, if the time that the storage device 100 can be operated by the power from the auxiliary power source 140 is 10 [ms] and the maximum data size that can be written into the saved value storage area within 10 [ms] is 1 [MB], the controller 110 may limit the saving area size to 1 [MB]. This procedure enables appropriate setting of the size of the saving area reserved in the volatile memory.

Also, although in the first embodiment to the fifth embodiment, the memory 150 is a volatile memory, the memory 150 may be a non-volatile memory. For example, the memory 150 may be a NAND-type flash memory, a bit cost scalable (BiCS) memory, a magnetoresistive memory (MRAM), a phase-change memory (PcRAM), a resistive random-access memory (RRAM®), or a combination thereof.

At least one of the above-described embodiments has a volatile memory 150, a non-volatile memory 160, a controller 110, and an auxiliary power source 140. The volatile memory 150 stores setting values of the storage device 100. The controller 110 controls the storage device 100 based on the setting values stored in the volatile memory 150. The auxiliary power source 140 supplies power to the storage device 100 in place of the main power supply unit 130 if the power supply from the main power supply unit 130 of the storage device 100 is improperly stopped. If the controller 110 receives a Set Features command that includes a setting value from the host 200, the controller 110 writes the setting value included in the Set Features command into the volatile memory 150. If the power supply from the main power supply unit 130 is to be stopped, the controller 110 writes the setting values stored in the volatile memory 150 into the non-volatile memory 160 before the supply of power from the auxiliary power source 140 stops.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:
1. A storage device, comprising:
   a volatile memory;
   a nonvolatile memory;
   an auxiliary power source; and
   a controller configured to start a setting process to store a setting value into the volatile memory in response to a setting command received from a host, and to operate in accordance with one or more setting values stored in the volatile memory, said one or more setting values including a setting value corresponding to frequency of processing to be performed with respect to the non-volatile memory, wherein
   when the controller determines that a main power supply will stop, power supply from the auxiliary power source starts to be primarily used, and the controller saves at least part of said one or more setting values stored in the volatile memory into the nonvolatile memory, before the power supply from the auxiliary power source ends.

2. The storage device according to claim 1, further comprising:
a voltage detection circuit configured to detect a voltage value of the main power supply and output the detected voltage value to the controller, wherein
when the detected voltage value is smaller than a threshold, the controller determines that the main power supply will stop.

3. The storage device according to claim 1, wherein
in response to a power off notification from the host, the controller saves said one or more setting values in the volatile memory into the nonvolatile memory using power supply of the main power supply, and then shuts off the main power supply.

4. The storage device according to claim 1, wherein
when the controller determines that the main power supply will stop, the controller also saves data stored in the volatile memory, which is different from said one or more setting values therein, before saving said one or more setting values.

5. The storage device according to claim 4, wherein
the data different from said one or more setting values include user data instructed to be stored in the nonvolatile memory by the host.

6. The storage device according to claim 5, wherein
the data different from said one or more setting values include also a transaction log, and the transaction log is saved into the nonvolatile memory before the user data.

7. The storage device according to claim 4, wherein
in response to determining that the setting process is being carried out when the controller determines that the main power supply will stop, the controller carries out saving of the data different from said one or more setting values, after interrupting the setting process.

8. The storage device according to claim 7, wherein
after the saving of the data different from said one or more setting values, the controller resumes the setting process, and then carries out saving of the setting values stored in the volatile memory through the setting process to the nonvolatile memory.

9. The storage device according to claim 7, wherein
after the saving of the data different from said one or more setting values, the controller determines whether or not saving of the setting value to be stored in the volatile memory through the setting process to the nonvolatile memory can be completed before the power supply from the auxiliary power source ends,
when it is determined that the saving can be completed, the controller resumes the setting process, and then carries out the saving of the setting value into the nonvolatile memory, and
when it is determined that the saving cannot be completed, the controller carries out saving of a corresponding current setting value into the nonvolatile memory without resuming the setting process.

10. The storage device according to claim 1, wherein
the volatile memory includes a first memory region and a second memory region,
during the setting process, the controller stores the setting value into the first memory region and then copies the setting value in the first memory region to the second memory region, and
when the controller determines that the main power supply will stop, the controller saves at least part of one or more setting values in the second memory region of the volatile memory into a third memory region of the nonvolatile memory.

11. The storage device according to claim 10, wherein
when a setting value in the second memory region is the same as a corresponding setting value in the third memory region, the controller does not save the setting value in the second memory region into the third memory region.

12. The storage device according to claim 10, wherein
the first memory region is included in the second memory region.

13. The storage device according to claim 10, wherein
during the setting process, the controller stores, into the second memory region, management information indicating whether or not the setting value has been copied to the second memory region, and
when the controller determines that the main power supply will stop, the controller saves the management information corresponding at least part of one or more setting values in the second memory region into the third memory region of the nonvolatile memory.

14. The storage device according to claim 13, wherein
when the storage device starts operating, the controller reads management information corresponding to a setting value from the third memory region,
when the read management information indicates that the setting value has been copied to the second memory region, the controller copies the setting value in the third memory region to the first and second memory regions, and
when the read management information indicates that the setting value has not been copied to the second memory region, the controller writes a default setting value in the first and second memory regions.

15. The storage device according to claim 10, wherein
the controller is configured to adjust a size of the second memory region based on remaining capacity of the auxiliary power source.

16. A storage device, comprising:
a volatile memory;
a nonvolatile memory; and
a controller configured to start a setting process to store a setting value into the volatile memory in response to a setting command received from a host, and to operate in accordance with the setting value stored in the volatile memory, the setting value including a setting value corresponding to frequency of processing to be performed with respect to the nonvolatile memory, wherein
when the storage device is turned off without the setting value being stored in the volatile memory through the setting process, upon restart of the storage device, the controller reads a default value from the nonvolatile memory and writes the read default value into the volatile memory.

17. A storage device, comprising:
a volatile memory;
a nonvolatile memory; and
a controller configured to start one or more setting processes to store one or more setting values into the volatile memory in response to one or more setting commands received from a host, and to operate in accordance with said one or more setting values stored in the volatile memory, wherein
when power supply to the storage device from a power source will stop, the controller saves a part of said one or more setting values in the volatile memory into the nonvolatile memory, and does not save another part of said one or more setting values in the volatile memory into the nonvolatile memory, before the power supply to the controller ends.

18. The storage device according to claim 17, wherein said one or more setting values stored in the volatile memory includes a setting value corresponding to frequency of a processing to be performed with respect to the nonvolatile memory.

* * * * *